US012587613B2

(12) United States Patent
Malan et al.

(10) Patent No.: US 12,587,613 B2
(45) Date of Patent: Mar. 24, 2026

(54) SYSTEM AND METHOD FOR DOCUMENTING AND CONTROLLING MEETINGS WITH LABELS AND AUTOMATED OPERATIONS

(71) Applicant: Advisor360 LLC, Needham, MA (US)

(72) Inventors: Gerald Malan, Ann Arbor, MI (US); Lawrence Huston, Ann Arbor, MI (US); Andrew Mortensen, Ann Arbor, MI (US); Ranganathan Gopalan, Wayland, MA (US); Sarah Greenberg, Old Lyme, CT (US)

(73) Assignee: Advisor360 LLC, Needham, MA (US)

( * ) Notice: Subject to any disclaimer, the term of this patent is extended or adjusted under 35 U.S.C. 154(b) by 149 days.

(21) Appl. No.: 18/454,212

(22) Filed: Aug. 23, 2023

(65) Prior Publication Data

US 2024/0073368 A1      Feb. 29, 2024

Related U.S. Application Data

(60) Provisional application No. 63/400,070, filed on Aug. 23, 2022.

(51) Int. Cl.
*H04N 7/15*          (2006.01)

(52) U.S. Cl.
CPC ............. *H04N 7/155* (2013.01); *H04N 7/152* (2013.01)

(58) Field of Classification Search
CPC ............................... H04N 7/155; H04N 7/152
See application file for complete search history.

(56) References Cited

U.S. PATENT DOCUMENTS

| | | | | |
|---|---|---|---|---|
| 11,206,372 | B1 * | 12/2021 | Zhang | ................. H04L 12/1813 |
| 11,627,006 | B1 * | 4/2023 | Chew | ..................... H04L 51/02 |
| | | | | 704/275 |
| 2018/0331842 | A1 * | 11/2018 | Faulkner | ................. H04N 7/15 |
| 2019/0341050 | A1 * | 11/2019 | Diamant | ............. G06V 40/172 |
| 2023/0115098 | A1 * | 4/2023 | Miller | ..................... G06F 40/30 |
| | | | | 704/235 |
| 2023/0137043 | A1 * | 5/2023 | Swerdlow | ........... H04L 12/1822 |
| | | | | 709/204 |
| 2023/0353708 | A1 * | 11/2023 | Springer | ................ H04N 7/155 |
| 2024/0013158 | A1 * | 1/2024 | Zahavi | .............. G06Q 10/1095 |

* cited by examiner

*Primary Examiner* — Stella L. Woo

(74) *Attorney, Agent, or Firm* — Crowell & Moring LLP

(57) ABSTRACT

A media presentation system includes a page editor enabling embedding into pages of clips referencing portions of a full time-indexed media recording. The pages can be shared with other users with different permissions levels. The media presentation system also allows for labeling and automated operations based on actions and phrased taken or spoken during meetings.

16 Claims, 17 Drawing Sheets

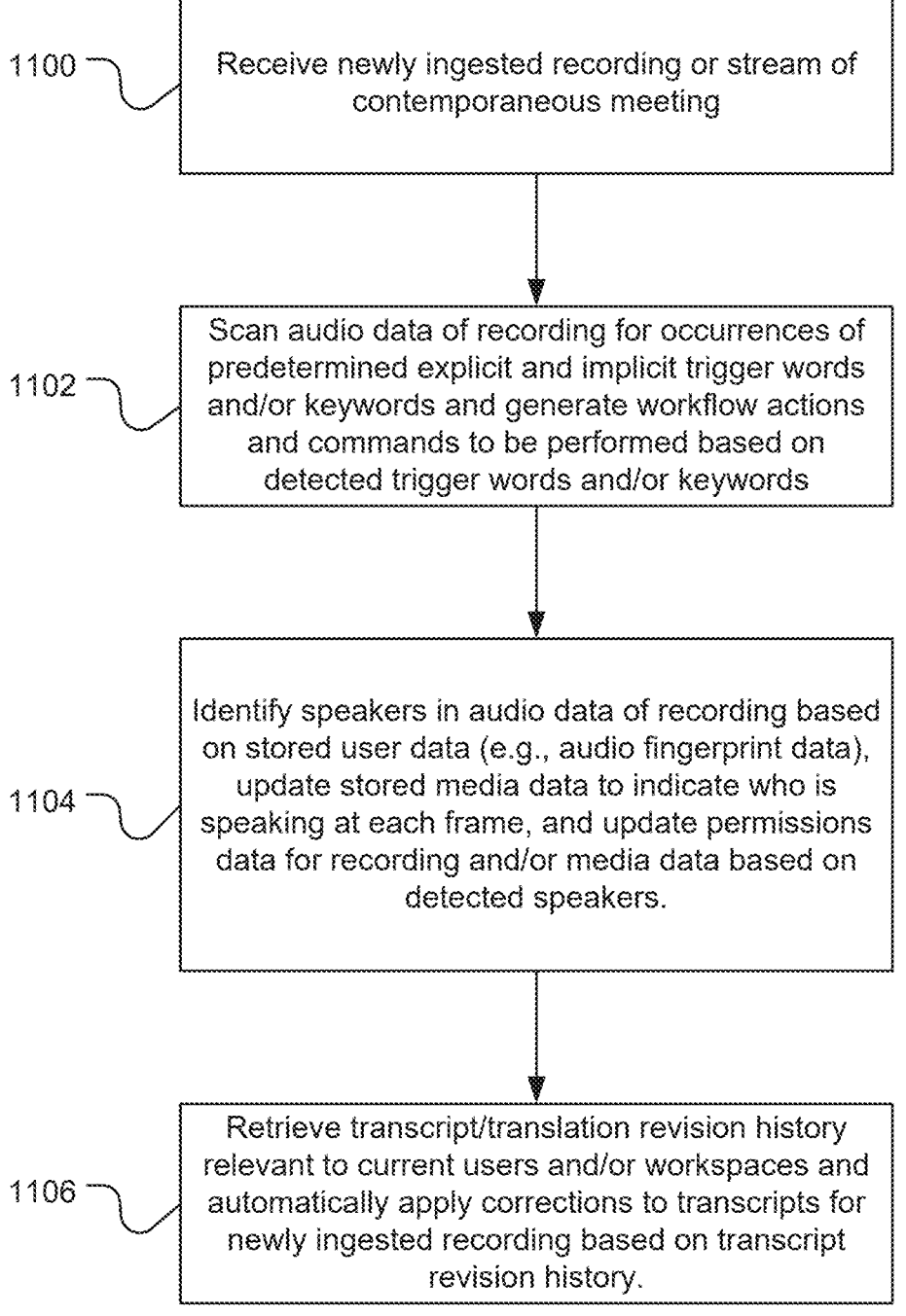

1100 — Receive newly ingested recording or stream of contemporaneous meeting

1102 — Scan audio data of recording for occurrences of predetermined explicit and implicit trigger words and/or keywords and generate workflow actions and commands to be performed based on detected trigger words and/or keywords 1104 — Identify speakers in audio data of recording based on stored user data (e.g., audio fingerprint data), update stored media data to indicate who is speaking at each frame, and update permissions data for recording and/or media data based on detected speakers.

1106 — Retrieve transcript/translation revision history relevant to current users and/or workspaces and automatically apply corrections to transcripts for newly ingested recording based on transcript revision history.

FIG. 6

SYSTEM AND METHOD FOR DOCUMENTING AND CONTROLLING MEETINGS WITH LABELS AND AUTOMATED OPERATIONS

RELATED APPLICATIONS

This application claims the benefit under 35 USC 119(e) of U.S. Provisional Application No. 63/400,070, filed on Aug. 23, 2022, which is incorporated herein by reference in its entirety.

BACKGROUND OF THE INVENTION

Video conferencing uses audio, video, and video and static media streaming to allow users who are located in different places to communicate with each other in real time and hold on-line meetings in a variety of contexts, including business, government, education, and personal relationships, to name a few examples. In a typical implementation, audio and/or video capture devices (e.g., microphones and cameras connected to or built into user devices such as desktop computers, laptop computers, smart phones, tablets, mobile phones, and/or telephones) capture audio containing speech of users or groups of users at each location and video visually depicting the users or groups of users and the user devices distribute static images and/or video that is being presented by and for the users. The audio and video data from each location is possibly combined and streamed to other participants of the meeting and can even be recorded and stored (e.g., as a media file) that can later be accessed directly or streamed, for example, to non-participants of the meeting seeking to find out what was discussed or participants of the meeting seeking to engage with the contents of the meeting after the fact.

At the same time, productivity client and cloud-based platforms such as word processing, presentation, publication, and note-taking programs exist for inputting, editing, formatting, and outputting text and still images. These are increasingly implemented in an online or hybrid online/desktop context (e.g., as a web application presented in a web browser, or as a desktop application or mobile app connected to a cloud-based platform), allowing for sharing and collaboration of the same document and files between multiple users. Notable examples include Microsoft Word and its related productivity programs included in the Microsoft Office 365 productivity suite developed by Microsoft Corporation and Google Docs and its related productivity programs included in the G Suite or Google Drive platforms developed by Alphabet Inc. Similarly, hypertext publication platforms such as wikis present, typically in a web browser, text and still images while also allowing collaboration between users in inputting, editing, formatting, and outputting the published content, often using a simplified markup language in combination with hypertext markup language (HTML).

SUMMARY OF THE INVENTION

Existing productivity and hypertext publication platforms have not effectively dealt with time-indexed media, such as audio or video, especially as would be generated in the context of an on-line meeting. For example, they typically do not treat contents of the audio or video media, including metadata such as speakers, words, and transcripts, as part of a page or document but rather as opaque attributes only accessible by an external media player.

Recently, a video conferencing and media presentation system has been proposed to allow manipulation and embedding of time-indexed media into documents or pages containing static web content (e.g., text, images). The media presentation part of such a system would ingest and store one copy of media data for recordings (e.g., of events such as meetings, presentations, conferences) and provide short sections of media, known as clips, that would reference ranges of the full recording. The media presentation system provides efficient, fine-grained reference and access control for an underlying base of stored time-indexed media data for recordings, including group and individual ownership rights and management schemes along with redaction functionality for users of the stored recordings.

The present disclosure builds on this work by enabling in-meeting control both in terms of recording, transcription, presentations, conference user interface, labeling, along with workflow actions and other automated actions, collectively termed meeting automations.

A labeling feature is used to denote parts of a meeting that are most useful for summarization, sharing, and integrating into an organization's business processes. These labels can be applied automatically by the system by analyzing transcripts and other information from the meeting's media data.

In the current instantiation of the labeling feature, it lets a meeting participant automate their notetaking and after-meeting actions by using recording cues (audio and video cues). This is enabled by natural language processing (NLP) either in real-time or after a meeting is over along with analysis by large language models (LLMs).

These labels are both system default defined and user-defined. They typically take the form of labels and automated operations that will correspond to parts of a meeting transcript or conversation and are stored in the text and metadata for each segment of the meeting recording. The automatic annotation of meetings with labels may also be complemented with direct notetaking by a user by either adding notes directly via the page editor during a meeting or through meeting chat channels (e.g. Zoom chat, Slack). The current implementation of the label and automated operation feature might include both artificial intelligence generated labels and annotations as well as direct user-input via chat logs, for example.

On the other hand, meeting automations or commands typically apply in real-time during ongoing meetings. Specifically, applying real-time natural language processing (NLP) and transcription, the meeting automations allow for immediate control of both meeting activities and in-meeting processes such as recording and transcription, as well as initiating asynchronous business processes.

In addition, the meeting automations also preferably include asynchronous business processes that can be triggered in real-time during a meeting. These could also be done post meeting in processing, but due to their time-sensitive nature would need to be started immediately. Generally, these automations are primarily things that an executive assistant would perform.

In some examples, the meeting automations capability are manifested as a bot that attends meetings like the other participants of the meeting. The video stream and/or images and/or audio associated with and representing the bot-participant are generated by the media presentation system to preferably be dynamic to indicate the current state of the bot-participant and indicate whether the meeting is currently being recorded or recording has been stopped or paused and to provide feedback concerning meeting automations. This dynamic representation is then served to the video conference or meeting.

One advantage or aspect of this approach is that the media presentation system can be employed with third party video conferencing systems such a Google Meet offered by Alphabet Inc, Zoom offered by Zoom Video Communications, Inc, and Microsoft Teams offered by Microsoft Corporation. One of the participants merely needs to invite the bot to the meeting.

In general, according to one aspect, the invention features a method for controlling a meeting. The method comprises ingesting a recording of a meeting, storing in a data store time-based media data of the recording of the meeting and analyzing the time-based media data for commands. The recording is then control such as starting and pausing the recording based on detected commands.

In embodiments, the commands include ending recording of the meeting and possibly redacting portions of the recording of the meeting. In addition, the commands might include controlling a display of the meeting.

The commands are indicated by a trigger word in some examples. In a related vein, the commands might also be indicated by addressing a bot that also attends the meeting.

In general, according to another aspect, the invention features a system for meeting recording and documentation. This system comprises a server system including a data store for ingesting time-based media data of a meeting and storing the time-based media data. A transcription and automation module analyzes the time-based media data for commands and the server system controls recording including starting and pausing the recording based on detected commands.

In general, according to another aspect, the invention features a method for documenting meetings. The method comprises generating a graphical user interface that enables users to author documents and to embed reference data defining referenced portions of time-indexed content from the meetings in the documents and displaying transcript text corresponding to the referenced portions. The time-indexed content is analyzed and labels added to the documents based on the analysis.

Often, the labels are displayed in association with the transcript text. The labels can indicate action items and/or areas of importance.

Preferably a search of the time-indexed content based on the labels is enabled, such as providing a list of suggested labels to search.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6 is a flow diagram illustrating an exemplary automation process of the media presentation system;

DETAILED DESCRIPTION OF THE PREFERRED EMBODIMENTS

Figure 1A:
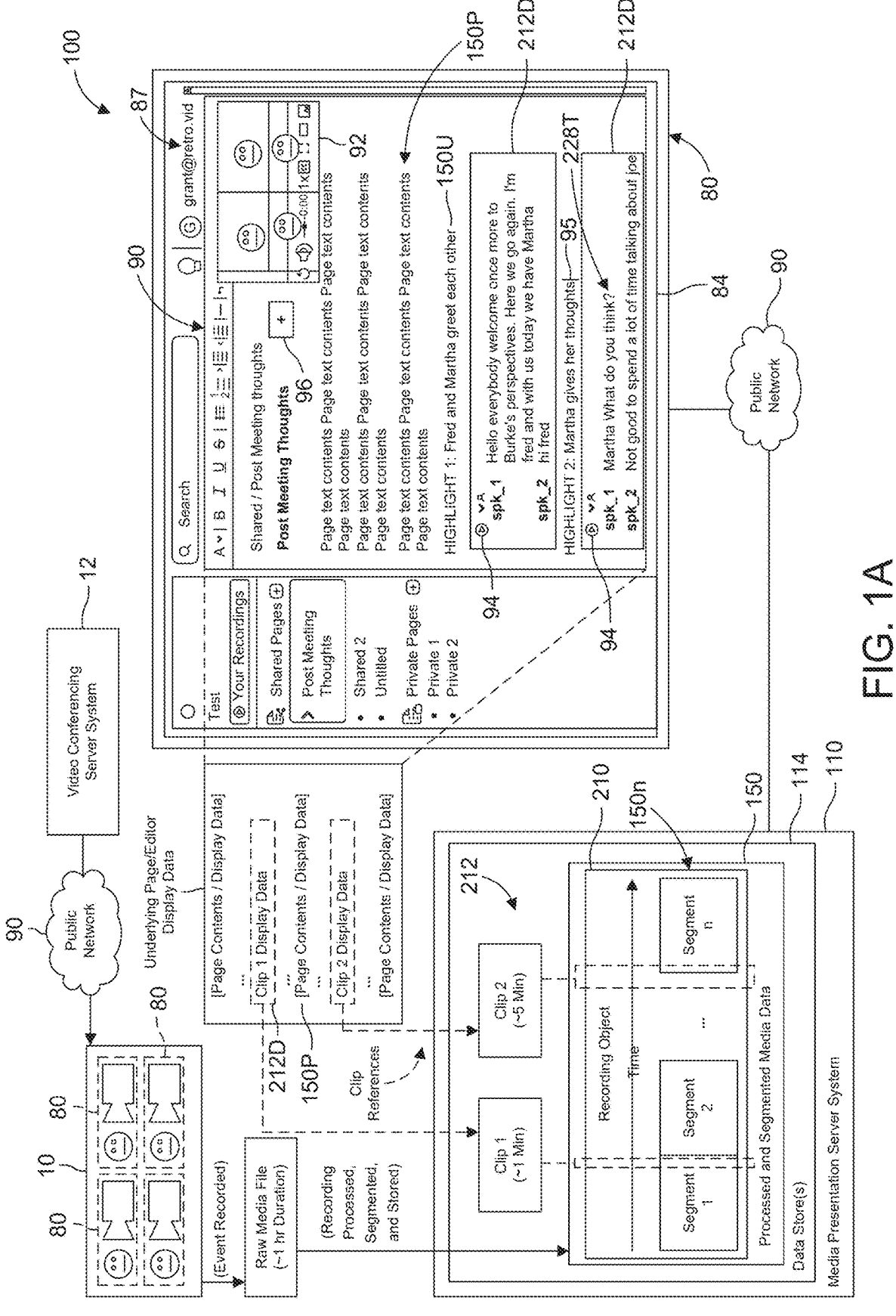
FIG. 1A is schematic diagram of an exemplary media presentation system according to one embodiment of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, the present invention relates to a video conferencing and media presentation system 100 for hosting or working with hosted video conferences and generating, presenting, editing, and sharing time-indexed media such as audio and/or video recordings of meetings and other events such as video conference meetings including presentations, conferences, or lectures, which occur in a variety of contexts, including business, government, education, and in personal relationships, to name a few examples. In examples, the video conferencing and media presentation system 100 provides video conferencing and hypertext publication platform and/or productivity platform enabling collaboration by a plurality of users in video conferencing and viewing, inputting, editing, formatting, and outputting user-authored content such as text and still images along with the shared time-indexed media. Background for this system is provided in U.S. Pat. Pub. No. US 2023/0156053 and U.S. Pat. Pub. No. US 2023/0154497 in addition to U.S. application Ser. No. 18/201,718, filed on May 24, 2023, all three applications being are incorporated herein by this reference in their entirety. This present disclosure further extends the system as described in these previously-filed applications, describing user interfaces and control schemes employed during the video conferences for meetings.

FIG. 1A is schematic diagram of an exemplary video conferencing, productivity and media presentation system 100.

In one example, the video conference meeting 10 is hosted by a video conferencing server system 12. As is the case with many presently-available platforms such as Google Meet offered by Alphabet Inc, Zoom offered by Zoom Video Communications, Inc, and Microsoft Teams offered by Microsoft Corporation, the video conferencing server system 12 receives real-time audio and/or video and presentations from the user devices 80 of each of the participants of the meeting 10 and distributes the audio/ video and/or presentations to the user devices 80 of the other participants. The audio/video and/or presentations are displayed on the user devices 80, often in windows or full screen presentations in which the participants are shown in panes, with other panes being dedicated to shared presentations, often in a screen or presentation sharing arrangement.

Also provided is a productivity and media presentation server system 110. It receives and stores time-indexed media 150 in data store(s) 114. In a common use-case, this time-indexed media is the audio/video/presentations associated with recorded events such as video conference meetings hosted by the video conferencing server system 12. This media presentation system itself is capable of serving documents and streaming the stored time-indexed media to the user devices 80, which present the documents and streaming time-indexed media to users of the user devices via graphical user interfaces 87 rendered on displays 84 of the user devices 80.

Typically, the time-indexed media 150 is a recording of an event such as a virtual meeting or video conference 10 but can be any type of audio and/or video data and/or any type of digital media with a temporal dimension of any duration.

In the illustrated example, the event 10 is a virtual meeting with four different participants at four different locations conducted using video and/or audio capture devices (e.g., cameras and microphones connected to or included as internal components of user devices 80 such as desktop computers, laptop computers, smart phones, tablets, mobile phones, and/or telephones) deployed at each of the often different locations. The video and/or audio capture devices capture audio depicting speech of participants or groups of participants at each location and video visually depicting the users or groups of users. In addition to being served and distributed to be presented in real time to the different participants (and/or possibly other participants that are not depicted) on their respective user devices 80 by the video conferencing server system 12, a combined stream of the audio and video data or separate streams from each location/user device are also recorded as raw media files by the media presentation server system 110 or later uploaded to the system 110. These media files of time-indexed data are then combined into documents displayed by page editors 90 that allow for the creation of associated user-authored content 150U such as plain text, formatted text, still images, tables, charts, bulleted lists, and/or other display elements.

The media presentation server system 110 ingests and processes the audio and/or video streams from each of the users devices directly or indirectly via the video conferencing server system 12 and records or stores those streams, generally partitioning the meeting's media data 150 into a number of segments 150$n$ (e.g., segmented media files) contained by a recording object 210 representing the full recording (e.g., the entire span of the originally ingested recording), and stores the segmented media data 150 in the data store(s) 114 along with clip data or clip objects 212 representing particular portions for different times of the full recording. The clips 212 include recording references (e.g., start/stop times) delineating the extent of the clips with respect to the full recording object 210 and also specific layers of the recording object. In the current example, the clips 212 refer to the specific time segments 150$n$ of the full recording object 210 that the recording was chunked into.

In the illustrated example, the audio and/or video streams of the event are represented and displayed on the user devices 80 in realtime as part of the video conference 10.

In one example, the recording object 210 also includes user-defined clip objects 212. The first clip object "clip 1" represents a portion of the full recording 210 with a duration of approximately one minute and, accordingly, includes a recording reference defining the one-minute span with respect to the duration of the full recording. Similarly, the second clip object "clip 2" represents a portion of the full recording with a duration of approximately 5 minutes and, accordingly, includes a recording reference defining the five-minute span with respect to the duration of the full recording 210. These respective clips are typically user defined references for the portions of the full recording that were of interest to the users.

In the arbitrary illustrated example, while the underlying stored media data corresponding to the portion of the recording represented by the first clip is entirely contained within one of the segmented media files, the underlying stored media data corresponding to the portion of the recording represented by the second clip spans across more than one of the segmented media files.

In general, the segmented media data 150 generated and maintained by the productivity and media presentation server system 110 is time-indexed, comprising a recording with a temporal or time-based dimension (e.g., corresponding to the duration of the recording and the duration of the recorded event) and media content for different points along the temporal dimension. In turn, the time-indexed media data has layers corresponding to the various different types of media content and metadata, such as video, audio, transcript text, translation text, presentation slides, meeting chats, screenshares, metadata, user-specified and/or automatically generated tags, user information (e.g., identifying current speakers and/or participants depicted visually), and/or user-specified notes, comments, and/or action items associated with different points along the temporal dimension. The layers can further include separate audio and video streams generated by each of the user devices 80 in the meeting. In general, the layers of the processed and segmented time-indexed media data stack or align with each other along the temporal dimension such that the media content provided on each of the different layers have a common time-index with respect to the same points in time along the temporal dimension.

The time-indexed media data 150 stored by the productivity and media presentation system 100 preferably comprises several layers of different types of time-indexed content (e.g., video, audio, transcript text, translation text, presentation slides, metadata, user-specified and/or automatically generated tags or labels, user information, and/or user-specified notes, comments, automations and/or action items) and/or of similar types (e.g., multiple different video or audio layers). In one example, multiple video layers of the media data are stored, each corresponds to different encodings of essentially the same video stream. Similarly, multiple audio layers of the media data each correspond to different encodings of essentially the same audio stream. On the other hand, multiple layers of the media data can also each correspond to distinct content streams that are nevertheless indexed and synchronized by the temporal dimension such that the different layers for the different types of content depict the same recorded event, at the same points in time along the duration of the recording, but from different aspects.

For example, the time-indexed media data comprises multiple video or audio layers, each video layer corresponding to streams captured by different video and/or audio capture devices at different locations. Here in this example, one video layer provides media data captured by one video capture device at one location visually depicting one participant, while other video layers provide video content captured by other video capture devices at different locations visually depicting other participants. Still other video layers include video streams depicting a screenshare session that occurred during the recorded event.

The time-indexed media data also usually includes several audio layers corresponding to each of the different video layers providing audio data captured by audio capture devices at the respective locations and depicting the speech of the respective speakers that are often visually depicted in the video layers. Thus, the different video or audio layers are typically associated with particular individuals, and text and/or metadata layers then define an association between the different audio and/or video layers depicting different individuals with different users of the media presentation system.

In other cases, the video and audio of the several participants is a combined audio and video provided by the video conferencing system 12 in which the video of the separate participants is displayed in the different panes of each video frame.

These text and/or metadata layers often also are associated with different users depicted within the same audio and/or video layers by referencing different points of time along the temporal dimension for which the defined associations (e.g., tags) are applicable. The text and/or metadata layers also preferably include time-indexed information concerning user permissions, ownership, and/or access rights specified in permissions data stored by the system, including information associating users with various roles with respect to portions of the recording defined via time information specified for each association indicated in the layer of the media data. In one example, the stored permissions data establishes that users tagged via a text/metadata layer of the media data as having the role of "speaker" with respect to a recording or portions of a recording (such as an individual that is depicted speaking at certain points in the audio and video layers or an individual that is considered a featured speaker for a portion of the recording in which other individuals also are depicted speaking, among other examples) should have edit and/or redaction rights for the portions within which they are tagged as a speaker.

Moreover, in addition to the layers discussed above, the time-indexed media data also typically includes layers for presentation content, including presentation slides showing different slides (e.g., of a PowerPoint slideshow or Slides from a G-Suite presentation) that were displayed during the recorded event at different points in time. Here, while one video layer visually depicts a presenter speaking, and one audio layer depicts the speech sounds from that presenter, a presentation slide or screenshare layer include time-indexed content for depicting the different slides (e.g., visually depicting the slides or portions of the slides via image data and/or providing actual text and/or formatting from the slides) or screenshare images or video along with timestamps specifying ranges of time for which the slides are applicable (e.g., corresponding to times when the slides were displayed during the event).

In any event, because the clips 212 include the recording references (e.g., start/stop times) delineating the extent of the clips with respect to the duration of the full recording 210, and because the layers of the time-indexed media data stack or align with each other along the temporal dimension such that the content provided on each of the different layers are indicated with respect to the same points in time along the temporal dimension, any clips referencing a portion of the recording can potentially encompass all layers of the time-indexed media data within the time period specified by the clip 212 or a subset of the layers.

In addition to generally presenting streaming media content of the recordings, the user device 80, via the graphical user interface 87 rendered on its display 84, enables users to author content (e.g., static content that is not time-indexed), for example, using the page editor 90 (e.g., word processing web app, wiki platform) for inputting, editing, formatting, and outputting pages 150P containing the user-authored content 150U such as plain text, formatted text, still images, tables, charts, bulleted lists, and/or other display elements. The pages 150P are viewed, created and/or edited by one or more users via the page editors 90 of one or more user devices, particularly via interface elements of the page editor 90 such as a text input box, a text formatting toolbar, and a cursor 95 indicating a current position for any incoming text input received by the user device such as via a keyboard.

Along with the user-authored content 150U, the media presentation system enables users to embed clip data defining referenced portions of time-indexed content from an event (e.g., the recording and its associated time-indexed media data stored in the data store). In one embodiment, the media presentation system includes a user app 85 executing on the user devices 80. This user app 85 renders the graphical user interface (GUI) 87 that includes the page editor 90 that enables the embedding of clip objects 212 representing the referenced portions of the time-indexed recording objects 210 into user-authorized multimedia documents 150P.

In more detail, the embedded clip objects or clips 212 are displayed and represented by the page editor 90 via clip display elements 212D, which reference content derived from the stored time-indexed media data (e.g., transcript text 228T) pertaining to the referenced portion of the recording and a clip play button, among other examples. These clip display elements 212D are rendered based on underlying page data for the displayed page; that page also includes the user-authored content itself (e.g., context-specific text 150U entered by users) along with display data indicated via one or more markup languages (e.g., HTML and/or other wiki-related markup languages). The clip display elements 212D includes clip references, which are references to relevant clip data 212 and/or portions of the time-indexed media data 210 stored in the data store(s) 114 of the server system 110 (e.g., transcript text 228T within the portion of the recording defined by the recording reference of the clip). In general, when initially loading a page to be displayed, the user device 80 first retrieves the page data 150P for the page to be displayed and then retrieves relevant content derived from the time-indexed media data 210 based on any clip reference data of clip references extracted from the page data.

Clip display elements 212D for embedded pages are generally formatted the same way as the user-authored content 150U of the page 150P, for example, having the same indentation level as any plain text around it and/or the same bullet and indention level appropriate to its position. The clip display elements include clip play buttons 94 for playing back the embedded clip in clip player 92.

Moreover, embedded clips 212 might have attributes (e.g., indicated in the clip data for the clip) that include which recording it came from, which speakers or participants were active in the clip, as well as other meta-information, all of which can be represented or hidden in the page editor 90 depending on the user's goals (e.g., based on user supplied or inferred display parameters).

The GUI 87 rendered on the display 84 user device 80 also includes a clip player head 92, which is a display element for controlling and displaying streaming playback of the portions of the time-indexed media data referenced by the embedded clips 212. In one example, the clip player 92 is first hidden and, in response to user selection of the clip play button 94 for an embedded clip, the clip player head 92 is displayed overlaid on the page editor 90, and the portion of the recording referenced by the selected embedded clip is streamed and presented.

More specifically, when the user app 85 loads a page, in addition to text-layers (e.g., transcript text) of the media data referenced by any embedded clips, the user app receives a playback descriptor or manifest including a playback token that, in general, grants access only to the referenced portion of the recording by describing ranges of media data the user is allowed to access. The user app stores the playback token and manifest in local memory of the user device and, in response to user selection of the clip play button for an embedded clip, uses the manifest to request the referenced portion of the recording and sends the playback token along with the request. The server system 110 determines whether the requested portion of the recording is authorized based on the playback token and, if so, streams the streaming media to the user device.

In general, the media presentation system allows the pages 150P created by one user via the user app and page editor 90 to be shared with and co-authored by other users with a variety of different permissions levels (e.g., view, edit). The page editor includes a share button 96. In response to user selection of the share button, the user app presents one or more additional interface elements (e.g., popup window with input elements) for receiving additional user selections indicating which users to share and/or which permissions to set for each of the indicated users. Any users granted access to a portion of the recording via an existing clip embedded within a page shared with them by another user (e.g., via the share button of the page editor presenting the page) can, in turn, share that same portion with other users by embedding a new clip based on the existing clip into one of their pages that they then share with others (e.g., via the share button of the page editor presenting the page). When embedding the new clip, the user can narrow the scope (e.g., the extent of the full recording referenced by the clip) of the new clip with respect to the existing clip, for example, by selecting only a portion of the transcript text of the embedded clip, copying the selected portion, and pasting the copied selection into the page editor for a page. However, when embedding a new clip from an existing clip, the user is prevented from expanding the scope beyond what was shared with them originally. For example, the inclusion of only the portion of transcript text pertaining to the embedded clip prevents selection of any portion outside of the displayed portion of the transcript. In one embodiment, an additional verification step is performed by the user app and/or the server system to confirm that any operation creating a new clip from an existing clip does not expand the scope of the new clip with respect to the existing clip.

In general, the media presentation system 100 also performs access control functionality at the level of full recordings. The access control and permissions for recordings are based on a group ownership scheme, in which any recording can have one or many owners that have full rights in accessing and modifying the recording. Any owners of a recording can add other owners for the recording (e.g., by selecting other users to add on the GUI) but are prevented from removing owners. In embodiments, the server system 110 initially sets owners of a newly added recording based on which user uploaded or imported the new recording, based on analysis of the new recording, and/or based on integration with a system or service that originally hosted the event depicted in the recording and/or generated the recording. Moreover, in different configurations, owners of recordings can correspond to different functional roles potentially played by users with respect to events and recordings of events, including users who added the recordings (as previously mentioned), users who were present at and/or contributed to the events, and/or users who are depicted in video or audio layers of the recordings, to name a few examples.

The media presentation system 100 allows redaction of portions of a recording, for example, based on permissions data and/or predetermined redaction control criteria (e.g., stored on the data store of the server system or in local memory of the user device). According to the permissions data and/or the redaction control criteria, the system allows owners (and only owners) of the recordings to redact the recordings, any owner of a recording can redact the recording, and any recording can be redacted by its owners at any time. In response to receiving a redaction request from the user app indicating a portion of the recording to be redacted, the server system modifies or deletes the media data for the indicated portion of the recording stored in the data store such that the redactions are reflected in any clips referencing the portion of the recording that was redacted. Redactions can include deleting any layer (audio, video, text, or any combination thereof) and/or replacing the deleted layer(s) with blank frames and/or text indicating that the portion of the recording was redacted. In one embodiment, redaction is permanent. For example, in response to receiving a redaction request from the user app, the server system executes the redaction request by destroying or clearing all artifacts of the media data for the redacted portion of the recording from the data store.

Figure 1B:
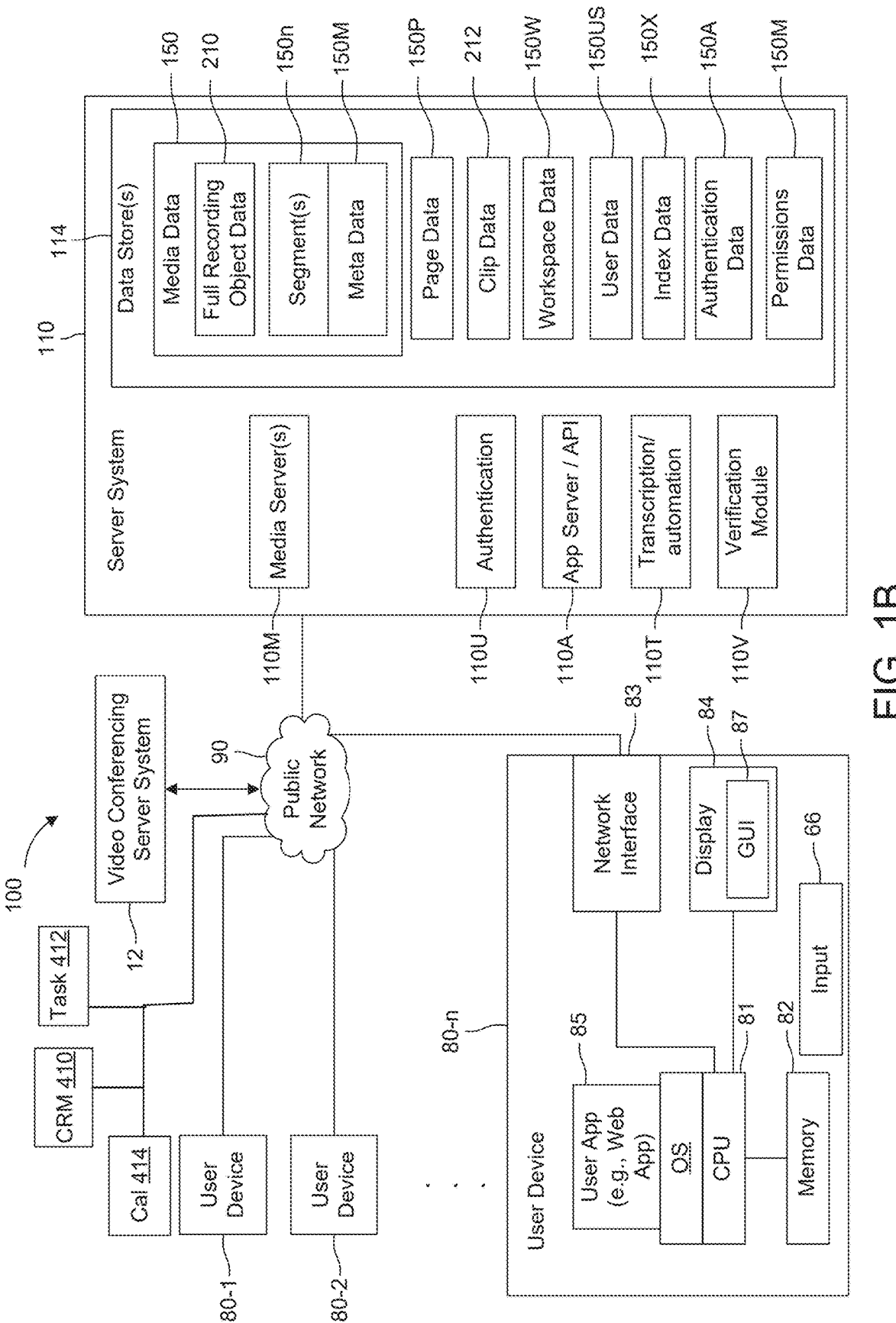
FIG. 1B is a schematic diagram of the media presentation system showing components of the system in additional detail and a possible hardware implementation.

FIG. 1B is a schematic diagram of the video conferencing and media presentation system 100 showing components of an exemplary user device 80-*n*, the video conferencing system 12, and productivity and media presentation server system 110 in additional detail and particularly how the system might be implemented in hardware.

In the illustrated example, a plurality of user devices 80 are connected to the video conferencing system 12 and productivity and media presentation server system 110 via the public network, such as the internet.

The media presentation server system 110 includes an app server 110A, one or more media servers 110M, usually an authentication module 110U, a verification module 110V, and one or more data stores 114.

The productivity and media presentation server system 110 and its data store(s) 114 are typically implemented as a cloud system. In some cases, the server system 110 includes one or more dedicated servers having respective central processing units and associated memory. In other examples, they are virtual servers that are implemented on underlying hardware systems. The server system 110 may run on a proprietary or public cloud system, implemented on one of the popular cloud systems operated by vendors such as Alphabet Inc., Amazon, Inc. (AWS), or Microsoft Corporation, or any cloud data storage and compute platforms or data centers, in examples. The server system 110, app server 110A, and/or media server(s) 110M can comprise or use various functions, modules, processes, services, engines, and/or subsystems. These various functions, modules, processes, services, engines, and/or subsystems, including the authentication module 110U and verification module 110V, and/or the app server and/or media server(s) themselves, are generally associated with separate tasks and can be discrete servers, or the separate tasks can be combined with other processes into a unified code base. They can be running on the same server or different servers, virtualized server system, or a distributed computing system. The server system 110 may also be implemented as a container-based system running containers, i.e., software units comprising a subject application packaged together with relevant libraries and dependencies, on clusters of physical and/or virtual machines (e.g., as a Kubernetes cluster or analogous implementation using any suitable containerization platform). Moreover, the user app 85, app server 110A, authentication module 110U, verification module 110V, transcription and automation module 110T and/or media server(s) 110M can utilize or comprise various interacting functions, modules, processes, services, engines, and/or subsystems that are associated with discrete tasks, implemented as services or microservices running on different servers and/or a centralized server of the server system, and accessible by clients (e.g., user app executing on user devices, other services running on the server system).

The data store(s) 114 provide storage for the processed and segmented time-indexed media data 150 along with the clip data 212 for the clip objects, the page data 150P for the different pages (e.g., including references to the clip data and segmented media data), workspace data 150W, and/or user data 150US used by the user app to present the different pages via the page editor and provide editing, collaboration, and sharing functionality for the different users. In addition, the data store(s) store authentication data 150A for verifying user-supplied credentials and generating new login sessions for the users. The data store(s) also store permissions data 150M for controlling access (e.g., reading and/or modifying) by users to pages, workspaces, and/or recordings (including media data). In one embodiment, the data store(s) are provided via a storage service accessed via a web interface, such as S3 provided by Amazon Web Services. In one example, newly ingested recordings, are stored as objects in an S3 bucket.

The app server 110A provides an application programming interface (API) and handles requests from the user devices 80 (e.g., via the respective user apps 85 executing on those user devices) to retrieve and/or modify any of the page data 150P, clip data 212, workspace data 150W, user data 150US, and/or index data 150X. The app server 110A also generally handles ingestion processing of new recordings.

The media server(s) 110M receive playback requests from the user apps 85 (along with possibly a playback token for authentication) and, in response, retrieve the time-indexed media data 150 for requested portions of full recordings (e.g., segments, portions of segments) from the data store(s) 114 and return the media data to the user device 80 (e.g., by generating playable media based on the retrieved media data and streaming the playable media to the user device). In one embodiment, the media server(s) 110M and any data stores 114 storing the processed and segmented media data are implemented as a content delivery network (CDN), and the user app directs the playback requests to particular servers at particular addresses indicated in streaming manifests provided by the app server 110A. In embodiments, the media server(s) user protocols, such as MPEG DASH or Apple HLS, are used to create playable pieces and stream them to the client.

In general, the authentication module 110U retrieves the stored permissions data 150M from the data store(s) 114 and generates signed cryptographic tokens identifying users and/or incorporating context-specific permissions data for the identified users. The tokens generated by the authentication module 110U are sent to the user device 80, which stores the tokens in local memory 82. The tokens can include session tokens, which the user device includes with requests to the app server to retrieve and display page data 150P and workspace data or modify data in the data store(s) such as permissions data, to list a few examples. The tokens can also include playback tokens, which the user device includes with playback requests to the media server(s) for streaming media data from the data store(s).

The verification module 110V generally enforces access control with respect to incoming requests for any data stored in the data store(s), including page data 150P, clip data 212, and/or media data based on tokens provided with the requests and/or permissions data 150M stored in the data store(s).

The user devices 80 are generally computing devices operated by users of the media presentation system 100, and the system can accommodate many user devices 80 operated by different users at different times or simultaneously. The user device 80 will typically be a desktop computer, laptop computer, a mobile computing device such as a smartphone, tablet computer, phablet computer (i.e., a mobile device that is typically larger than a smart phone, but smaller than a tablet), smart watch, or specialized media presentation device to list a few examples. Each user device 80 includes a central processing unit 81, memory 82, a network interface 83 for connecting to the public network 90, and a display 84. Executing on the processor 81 is an operating system OS and the user app 85, which generally receives user input (e.g., via input devices 66 such as a keyboard, mouse, and/or touch-screen, among other examples) indicating selections of pages to display via the page editor, changes to the pages, desired playback of recordings and/or clips, and new record-ings to be ingested, to name a few examples. The user app 85 also receives from the server system 110 information such as page data 150P including the clip data 212, work-space data 150W, user data 150US, and/or index data 150X for displaying the media data, page contents, the page editor 90, and other interface elements on the display 84 via the graphical user interface 87, which the user app 85 renders on the display 84. In one example, the user app 85 executes within a software program executing on the processor 81 (via the operating system), such as a web browser, and renders specifically a browser user interface within a larger GUI 87 serving the user app 85, web browser, and other applications and services executing on the processor 81 of the user device 80. In another example, the user app 85 executes as a standalone software program executing on the processor 81 (via the operating system) and renders its own GUI 87 (e.g., in one or more windows generated by the standalone software application).

As also shown, the system 100 also preferably interfaces with other third party tools. Illustrated examples include a calendaring system 414 for maintaining calendars for the users and other. Also shown are customer relationship man-agement platform 410, task management platform or work management platform 412.

Figure 2:
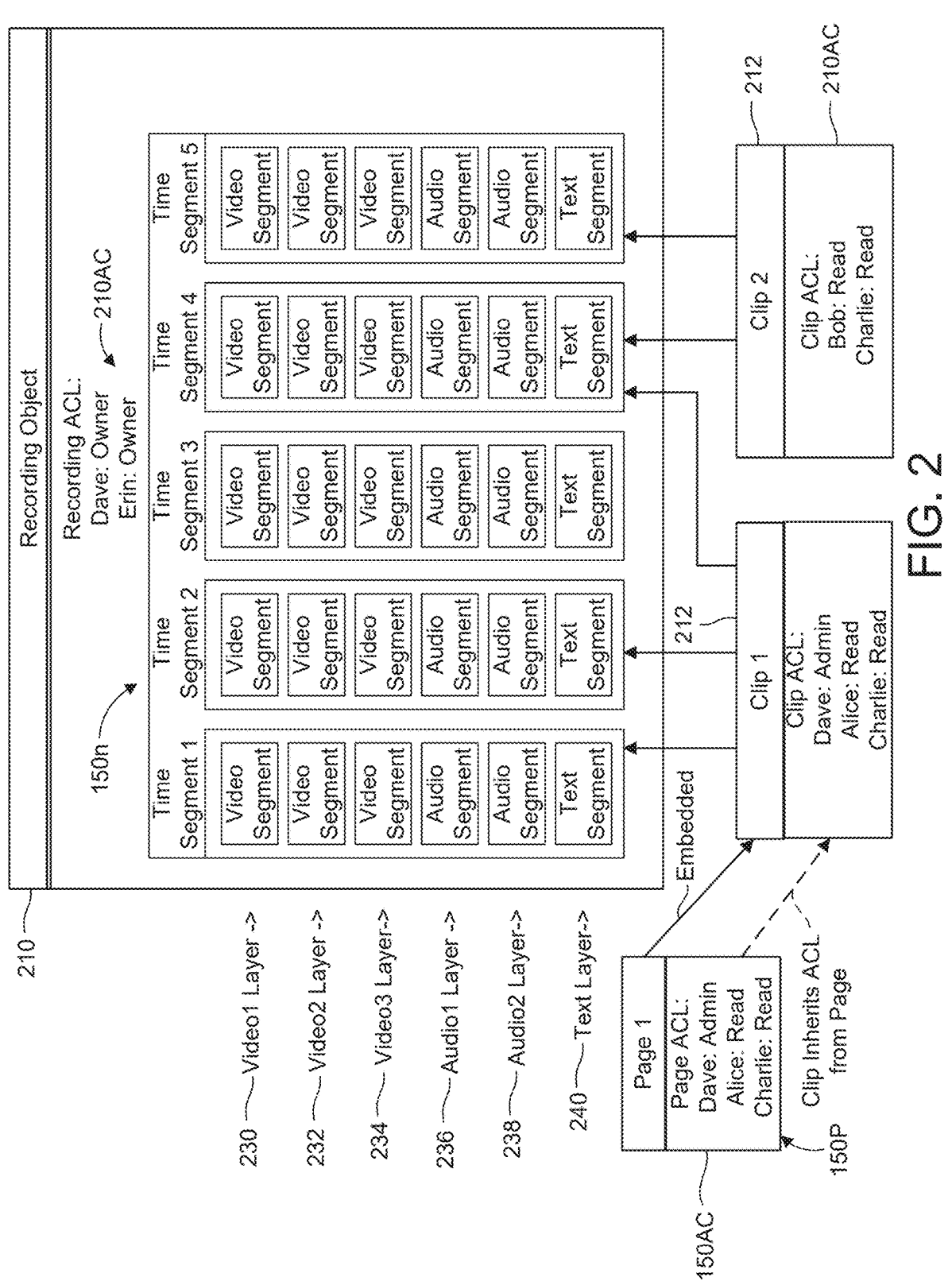
FIG. 2 is a schematic diagram showing an example of processed and segmented media data stored by the media presentation system.

FIG. 2 is an illustration of an example of the processed and segmented media data that is stored in the data store(s) 114 upon ingestion, showing how permissions data is stored.

In general, the recording object 210 has permissions data 210AC (e.g., an access control list or list of owners) and contains or is associated with five different media data segments 1-5 corresponding to successive portions of the original full recording. For each of the segments 150n, there are multiple bitstream layers, including three video stream layers 230, 232, 234, (Encoding A, Encoding B, Encoding C), two audio stream layers (Encoding 1, Encoding 1) 236, 238, and a text stream layer 240 such as a transcript of the event.

Additional time-indexed information is typically stored in the text stream layer 240. This includes a transcription of the audio, translations, speakers (i.e., identifying the speaker who spoke the words in the transcription), and tags, com-ments, other annotations, and chat messages, among some examples. In some examples, this additional information is contained in separate time-indexed layers.

Within each of the segments, there are video, audio, and text segments corresponding to the respective layers 230, 232, 234, 236, 238, 240. In the illustrated example, the access control list for the recording object indicates that both user Dave and user Erin have an "owner" status with respect to the recording.

Referencing portions of the recording object are two clip objects 212, each of which has an "embedded" relationship with a page object 150P (although only one page object is shown in the illustrated example for the sake of clarity). Each of the clip objects inherits an access control list 210AC from the page object 150P in which the respective clip is embedded. In the illustrated example, the first clip object has an access control list indicating that user Dave has "Admin" permissions, user Alice has "Read" permissions, and user Charlie has "Read" permissions with respect to the first clip. Accordingly, the recording object 210 included in the illus-trated example has the same access control list, since the first clip inherits its access control list from the depicted page object 150P. The second clip has an access control list indicating that both users Bob and Charlie have "Read" permissions with respect to the second clip.

Here, because user Dave is an owner of the recording object, the user can read, modify, redact, and share all segments of the recording object and add other users as owners of the recording, which is also true of user Erin. User Dave can also modify the contents of the page in which the first clip is embedded.

Because the first clip object references Segment 1, Seg-ment 2, and Segment 4, users Alice and Charlie can both view media data for these segments and the layers within each segment and share them with other users (e.g., by copying and pasting from the clips embedded in the page object). Similarly, because the second clip references Seg-ment 4 and Segment 5, users Bob and Charlie can both view media data for these segments and share them with other users. However, because none of them is indicated as owners of the recording 210, none of them can redact these seg-ments or any other segments of the recording. Also, because they each only have "read" permissions for the respective page objects, they can only view the pages and cannot edit any of its contents.

Figure 3:
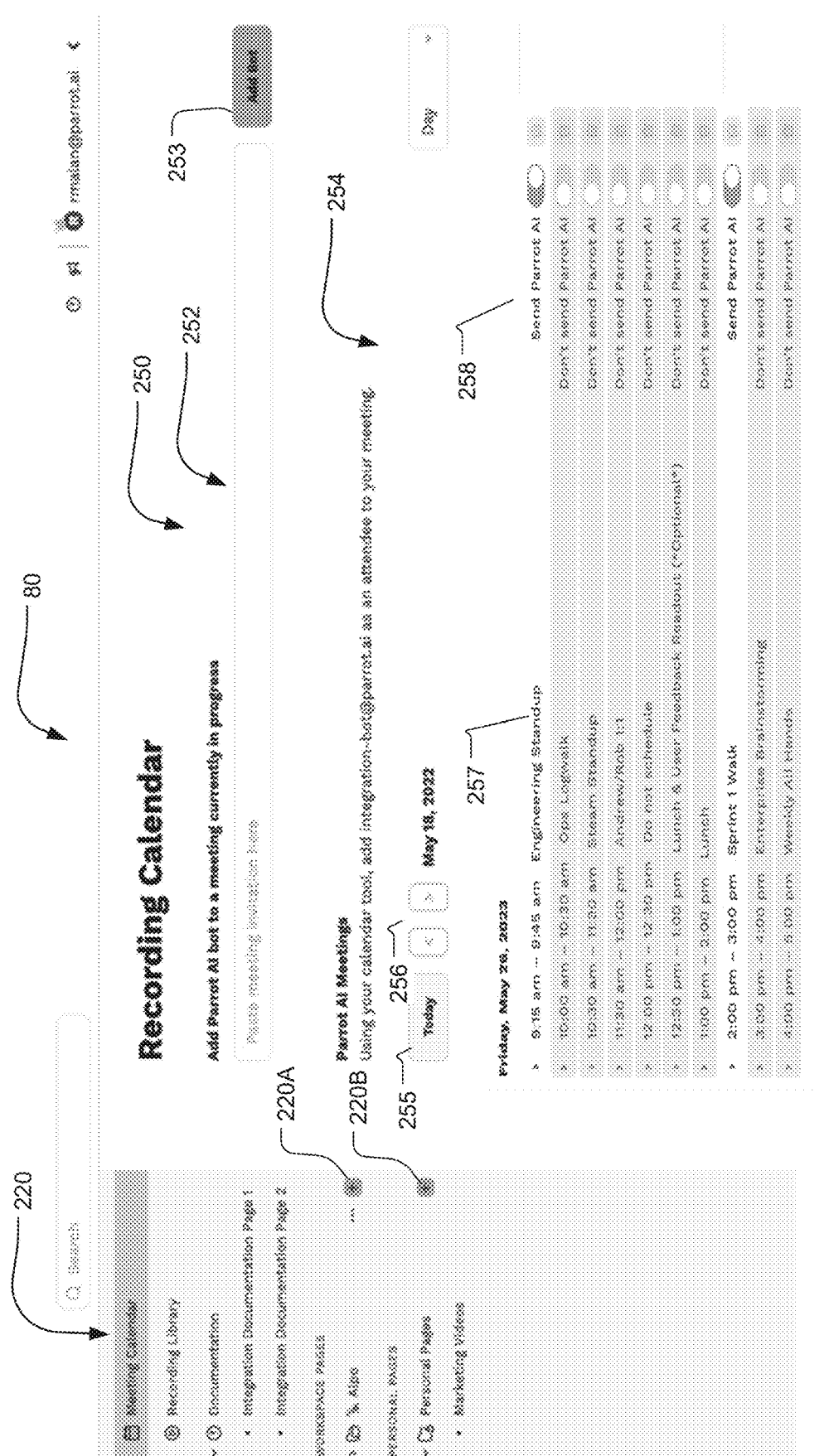
FIG. 3 is a screenshot of an exemplary recording calendar screen of the GUI of the media presentation system including an add bot link text box.

FIG. 3 is a screenshot of an exemplary recording calendar screen of the GUI 87.

In general, the GUI 87 is rendered by the user app 85 and displayed on the display 84 of the user device 80 and includes a series of screens or views, which comprise graphical elements (such as icons, virtual buttons, menus, textual information) arranged within windows and/or panes that are served by the app server 110A of the server system 110. In response to detecting input from the user indicating interaction by the user with the graphical elements, the user app 85 receives input indicating selection of various options or functions represented by the graphical elements.

More particularly, the illustrated recording calendar screen of the GUI comprises a page navigation pane 220 and a recording calendar pane 250.

The page navigation pane 220 includes a selectable page directory arranged in a hierarchical fashion allowing nested groups of pages to be expanded (e.g., revealed) or collapsed (e.g., hidden) in a shared pages section or a private pages section. The page navigation pane also includes add shared pages buttons 220A and add private pages button 220B, which, at the root level, are always displayed but at other levels of the hierarchy are only displayed when one of the pages indicated in the hierarchy is currently selected or hovered over (e.g., via a pointer of a mouse device).

The recording calendar pane 250 features an add bot link current meeting text-entry box 252. In its typical use, the user pastes a link such as a meeting link or invitation link to an in-session meeting that the user wants the bot to attend. Such meeting links are generated by typical teleconferenc-ing systems as a way of providing users with selectable links so that they may enter a specific online meeting designated by the link. Once the user has pasted that link, the add bot button 253 is selected by the user. This pushes the meeting designated by the link into the bot's calendar.

On the other hand, the recording calendar pane 250 also features a calendar list 254 portion listing meetings to which the bot has been previously invited to attend. In the calendar list portion, the meetings are arranged in increasing time descending down the page. The user selects different days by using the Today button 255, and forward/back buttons 256.

The calendar list 254 shows the date and time of the meetings on the bot's recording calendar. There is also a column for the title of the meeting 257 and a column for toggles to choose whether to send the bot to the meeting.

Figure 4:
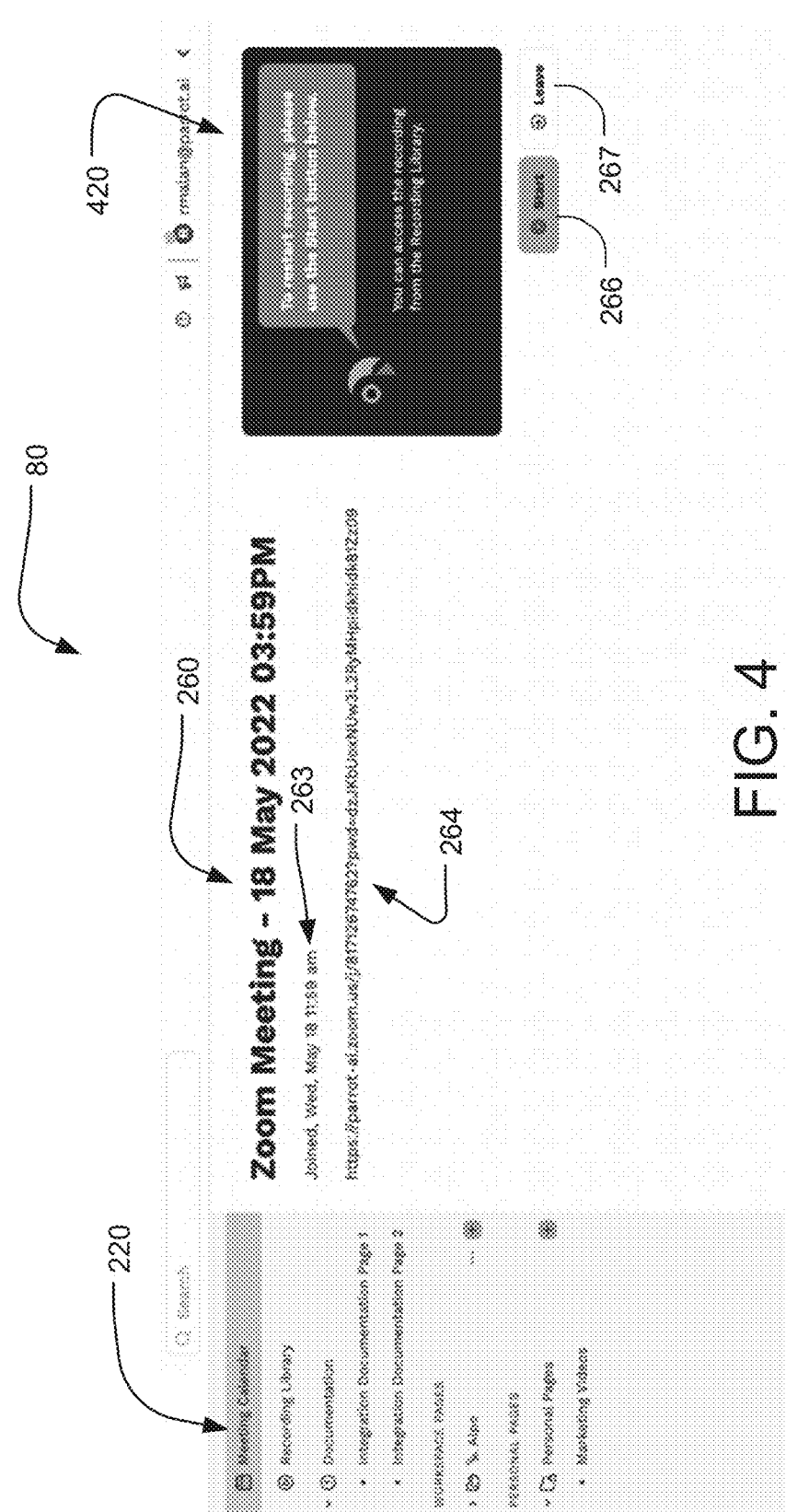
FIG. 4 is a screenshot of the GUI of the media presentation system showing a meeting page editor screen.

FIG. 4 is a screenshot of the meeting page editor screen 90 of the GUI 87 when a particular meeting has been selected from the list displayed in the calendar list portion 254. It shows the date and time of the meeting 260. Also shown is the meeting status 263 and a link to the meeting 264. In the illustrated example, the meeting had been joined by the user.

When the meeting page editor screen is served by the app server 110A of the server system 110 during an active meeting, a bot status graphic 420 is shown in the right side representing the meeting bot. This graphic in the illustrated example is a static graphic indicating the current status of the bot and by extension the productivity and media presentation server system 110. The particular graphic indicates that the bot and thus the media presentation server system 110 is currently not recording the indicated meeting.

Finally, also on the right side are the controls for the bot including a start button 266 and a stop button 267 for starting and stopping, respectively, the recording function of the bot/media presentation server system 110.

The meeting link is a link to a page with the meeting details from the meeting invitation. This information can include calendar invite information like meeting agenda, invitees, etc. In this example, just the zoom meeting link is shown since it was a dynamic meeting (ongoing and not scheduled).

This page editor screen page is dynamic, whereas meeting recordings are stopped and started, the media data appear as embedded clips like other pages in the system. Moreover, the entire page is collaboratively editable by the app server 110A of the server system 110 so that during the meeting real-time notes can be added.

This page also shows all of the system users that will be owners of the meeting page and recordings after the meeting has ended.

Figure 5:
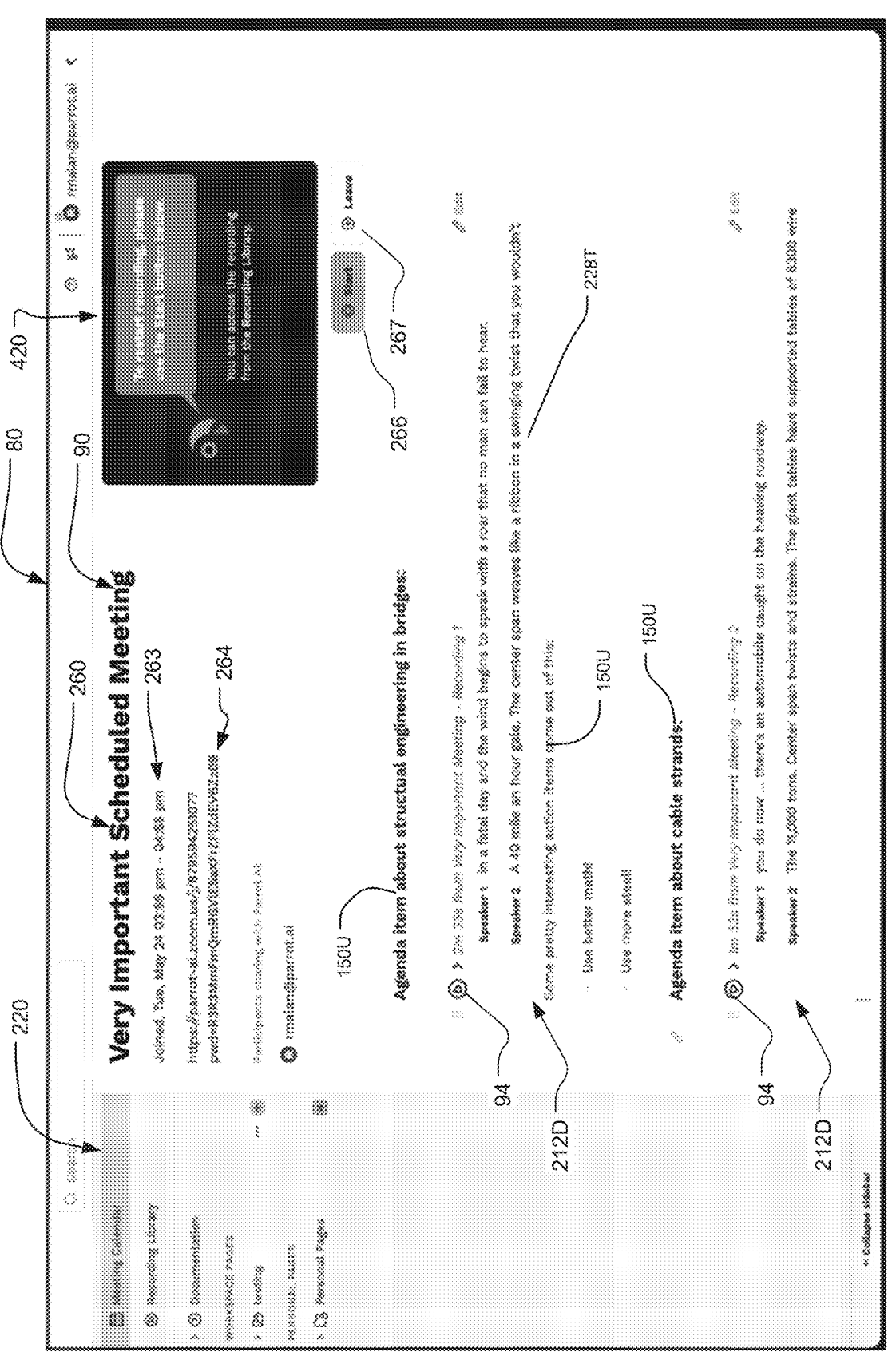
FIG. 5 is a screenshot of the GUI of the media presentation system showing the page editor screen of the GUI for an on-going meeting.

FIG. 5 is still another screenshot of the GUI of the media presentation system showing the page editor screen of the GUI 87 generated by the user app 85 for an ongoing meeting served by the app server 110A of the server system 110. The system generates a list of the registered participants besides the bot and provides that list as a meeting participant list.

Also shown is exemplary meeting documentation. There is user added text 150U interspersed with user defined clip display elements 212D from the meeting and system-generated transcript text 228T associated with the clips.

FIG. 6 is a flow diagram illustrating an exemplary automation process for processing recordings of ongoing or previously recorded meetings.

First, in step 1100, the media presentation system 100 receives a newly ingested recording. This recording could be of a previous meeting that has already terminated where the recording is obtained from a video teleconferencing system 12. In other examples, the system ingests a stream of audio and video data from a meeting that is occurring contemporaneously so that the ingestion is performed in real time. This realtime mode is necessary for detecting and processing commands for controlling the bot and thus the media presentation system 100.

In step 1102, the transcription and automation module 110T of the media presentation system (e.g., the app server of the server system) transcribes the spoken words in the recording and possibly translates the speech and then scans audio data and transcription of the recording for occurrences of any predetermined explicit or implicit trigger words and/or keywords and generates labels and/or workflow actions and/or commands and other meeting automations to be performed based on the detected trigger words, actions and commands and/or keywords. In one example, the system monitors for an explicit trigger word spoken by one of the meeting participants and initiates an automated operation for creating an action item (e.g., a user stating a predetermined phrase "create action item") and generates an item for an action item or to-do list associated with one or more users. This item is then created in the calendaring system 414 by interfacing with that third party system via its application programming interface (API). In other examples, the system also interfaces with a customer relationship management platform 410, and task management platform or work management platform 414 to create tasks or other operations based on the spoken phrases. In another example, the system detects an implicit trigger phrase automated operation for sharing the recording or portion of the recording to (e.g., a user stating naturally in context "invite Alice" or "get input from Bob on this") and generates a prompt to share the recording or portion of the recording (e.g., a predetermined period of time before and after occurrence of the trigger, only a discrete portion in which the current speaker who stated the trigger is speaking) with another user. In another example, the system detects occurrences of predetermined keywords and generates labels to assign to the media metadata at the points where the keywords occurred based on the detected keywords. These labels are inserted into the text and metadata segments in connection with the portion of the transcript containing the trigger words. Then the labels and other embedded information are employed to extract user intent via a large language model (LLM). In some examples, the embedded information or embeddings are used to automatically segment the transcript by topicality as well as potentially extracting user intent via LLM.

Generally, meeting automations are a way of issuing commands to the media presentation server system 100 in real-time during ongoing meetings. Specifically, the transcription and automation module 110T employs real-time natural language processing (NLP) to scan the speech of the meeting participants for commands for the immediate control of both meeting activities of in-meeting processes such as recording and transcription, as well as initiating asynchronous business processes.

Some examples of real-time meeting automations that would apply to the meeting itself include commands such as:
"[Trigger Word], start recording"
"[Trigger Word], stop or pause recording"
"[Trigger Word], leave meeting"
"[Trigger Word], redact the last 5 minutes of the meeting"
"[Trigger Word], redact the last exchange"
"[Trigger Word], focus on the shared screen"
"[Trigger Word], record us in gallery mode"
In an example, where the system is represented as a bot, the trigger word would the bot's name.

In these examples of command control, the users issues the commands to the media presentation server system 100 to start recording the meeting, stop or pause recording, end the system's participation in the meeting, redact portions of the meeting, and control the display of meeting on the user devices and subsequent recordings. These commands change not only what is happening in real-time, but change the part of the meeting that is recorded—e.g. focus on individual speakers vs. gallery mode vs. shared screen.

In realtime, the transcription and automation module 110T scans the incoming audio and video for the trigger word in the audio, or a trigger action, such as a handware, in the video. When the trigger word or action is recognized, the transcription and automation module 110T interprets the subsequent words from the speaker as a command to the system 100 and executes the corresponding actions such as start recording the meeting which begins the process of storing the time-index media data to the datastore 114, stops recording to the datastore 114, ends the system's participation in the meeting, redacts portions of the meeting, and controls the display of meeting on the user devices.

Additional in-meeting actions include those that use the system as a more active participant in the meeting. Examples include:

Playing and/or recording asynchronous updates from non-present meeting participants.

Searching the system for existing recordings and clips from other pages

Selecting and playing moments from other pages and meeting into the current meeting This second set of in-meeting examples highlight the incorporation of other asynchronous meeting content into the synchronous real-time meeting. Imagine an engineering standup meeting where people record their updates ahead of time and send them to the system for a meeting in the future. The system then plays these for the other people in the meeting, with realtime ability to pause, start, stop, rewind these asynchronous recordings.

Additionally, the system 100 is preferably interactive as well as described above: a meeting participant wants to find the parts of previous meetings where a certain action or keyword occurred. The participant asks the system, "[Trigger Word], find the last meeting where we discussed this topic." The system 100 finds the appropriate meetings and their corresponding moments to display in the system. The participant can then ask the system to play the part of the moment and share the screen with the other participants.

A third set of examples of meeting automations include asynchronous business processes that can be triggered in real-time during a meeting. These could also be done post meeting in processing, but due to their time-sensitive nature would need to be started immediately. These examples are primarily things that an executive assistant would perform. Some examples include:

"[Trigger Word], call an Uber for Rob to pick him up after the meeting"

"[Trigger Word], find Rob, and get him to join the meeting"

"[Trigger Word], setup a followup meeting for the current participants"

"[Trigger Word], add this to the current meeting's group set of reminders"

The last example, "[Trigger Word], find Rob, and get him to join the meeting" demonstrates a level of integration with other business applications and processes. In this case, the system understands who 'Rob' is in the meeting context—there may be back and forth with the participants either via the application or via audio/voice interactions. The system then interacts with the meeting participants to clarify and verify commands. To continue this example, the system identifies that the Rob in the meeting invite that has not joined the video conferencing meeting. It would clarify and verify this with the participants, "Is the Rob you want me to find the Rob on the meeting invite?" The participants would say, "Yes, [Trigger Word]". Then the system then finds Rob on instant messaging or email SMS text and reminds them with the appropriate zoom meeting URL. It would then give feedback in the system either by updating the application's visual feedback or via audio (Rob has been reminded in slack).

Often in these examples, the transcription and automation module 110T is accessing the third party systems such as the calendaring system 414, customer relationship management platform 410, and task management platform or work management platform 414, and others via their respective APIs to create events, document customer interactions, and create tasks.

In some examples, the meeting automations are manifested as a bot that attends meetings like the other participants of the meeting. The video stream and/or images and/or audio associated with and representing the bot-participant are generated by the media presentation system to preferably be dynamic to indicate the current state of the bot-participant and indicate whether the meeting is currently being recorded or recording has been stopped or paused and to provide feedback concerning meeting automations. This dynamic representation is then served to the video conference.

In step 1104, the system identifies speakers depicted in the audio data of the recording based on stored user data, which may include audio fingerprint data configured and stored for each user, and updates stored media data for the recording to indicate the detected user as the speaker at each frame of media data where the user's voice is detected. The system might also update the stored permissions data for the recording and/or media data based on the detected speakers by, for example, setting detected speakers as owners of the recording and/or giving detected speakers read, modify, and/or redact permissions to portions of the recording where they are detected.

In step 1106, the system retrieves a transcript/translation revision history relevant to current users and/or workspaces and automatically applies corrections to transcripts for newly ingested recordings based on the transcript revision history. Here, for example, the media presentation system can use machine learning and/or artificial intelligence to learn specialized terms used by particular groups of users or within particular workspaces and calibrate its automatically generated transcriptions to account for these specialized terms that might not otherwise be detected during speech recognition.

Labeling

A labeling feature is used to denote parts of a meeting that are most useful for summarization, sharing, and integrating into an organization's business processes.

In the current instantiation, the labeling feature lets a meeting participant automate their notetaking and after-meeting actions by using recording cues (audio and video cues). This is enabled by natural language processing (NLP) and/or a large language model either in real-time or after a meeting is over. The current instantiation uses LLM embeddings to automatically label parts of the transcript with topics and segment boundaries. Moreover, we can use these to drive automation via command interpretation as well via LLM processing.

The meeting transcript is processed by the transcription and automation module 110T either in realtime during the meeting, on a lag during the meeting or as a post processing operation by the transcription and automation module to generate tags.

These labels are typically both system default defined and user-defined. They often take the form of labels and automated operations that will correspond to parts of a meeting transcript or conversation and are stored in the text and metadata for each segment of the meeting recording. The automatic annotation of meetings with labels may also be complemented with direct notetaking by a user by either adding notes directly via the page editor during a meeting or through meeting chat channels (e.g. Zoom chat, Slack). The current implementation of the label and automated operation feature includes of both artificial intelligence including large language model generated labels and annotations as well as direct user-input via chat logs.

Labels and automated operations often correspond to parts of a meeting that will carry forward into other parts of the business process. Examples include: taking action items, marking part of a conversation worth remembering or sharing, etc.

In addition, during realtime processing additional automated operations such as "stop recording" or "start recording" are used to allow the using to provide in-meeting control of the system.

There are many ways to apply artificial intelligence (AI), large language model, and search to a meeting recording to generate labels and automated operations including NLP, fuzzy matching, and regular expression matching based on trigger words and expressions. LLM can be used to automate actions and initiate workflows.

A simple example using trigger words and regular expressions is described in Table 1 to give an idea of the types of meeting labels and automated operations. These are matched against the audio stream of the meeting. They can also be matched against other channels in the meeting such as chat transcripts, etc.

TABLE 1

Sample Regular-Expression-based label and automated operation

| Label or automated operation | Trigger Words/Expressions |
| --- | --- |
| Action Item | action item |
| | that's an action |
| | take that as an action |
| | follow up |
| | follow up with |
| | I'll take that |
| | I got that |
| Remember | remember that |
| | mark this |
| | remind me |
| | remember to do that |
| | remind me |
| | follow up on that |
| | circle back |
| Share | share with |
| | share this with |
| | send this to |
| | share meeting with |
| | share moment with |
| Create ticket | create ticket |
| | create a ticket |
| | make jira ticket |
| | make a jira ticket |
| | create jira ticket |
| | create a jira ticket |
| Summarize | summarize |
| | summary |
| | tldr |
| Redact | redact |
| | that's not cool |
| | erase that |
| | delete that |
| | don't record that |
| Interesting | that's interesting |
| | that's great |
| Heated Debate | Swearing, cursing |

There are additional features that can be extracted from the audio stream of a meeting that are not just parts of a transcript. Some examples include the amount of crosstalk between participants and volume changes in participants. These are combined with the amount of slang and swearing happening in a meeting to identify contentious points in a conversation. Some examples of these audio features that do not necessarily map to the transcript are listed in Table 2.

TABLE 2

Sample of Audio Features to extract
as label and automated operation

| Label | Features to match |
| --- | --- |
| Crosstalk | Multiple speakers trying to talk at once |
| Heated Debate | Speaker volume changes significantly |
| Sentiment analysis | Sentiment analysis of conversation tone |

In addition to audio feature extraction, other labels can also be extracted using visual analysis. These include labels like slide transitions, screen share changes, hand gestures, demonstrations, and meeting participant sentiment. Some examples are shown in Table 3.

TABLE 3

Sample Visual Features to Extract
as labels and automated operations

| Label | Features to match |
| --- | --- |
| Screen Share start/stop | Denote when recording switches to or from a screenshare |
| Slide Transition | When a screenshare has a static image that remains for some duration of time |
| New Topic in screen share | When significant part of a screen stays static for some duration of time |
| Sentiment Analysis | Measure sentiment of facia or body posture of speakers |

Finally, combining labels and automated operations with meeting participant metadata provide powerful annotation and label and automated operation creation. For example, by combining a participant's role and organization metadata with their audio/video automated operations, allow the system to automatically identify features like a 'customer request'—when a customer asks for something in a meeting; or a 'vendor promise'—when a vendor makes a commitment during the meeting. These advanced automated operations take into account the speaker, their role, and the conversational text of that moment to create the appropriate automated operation.

Business Process Automation

Automated operations highlight parts of a meeting that can be used in other parts of the business process. These are features as simple as someone wanting to remind themselves of important key pieces from a meeting. They encompass more complicated like automatically creating a workflow ticket in a process tool like Atlassian's Jira after a meeting is over.

Figure 7:
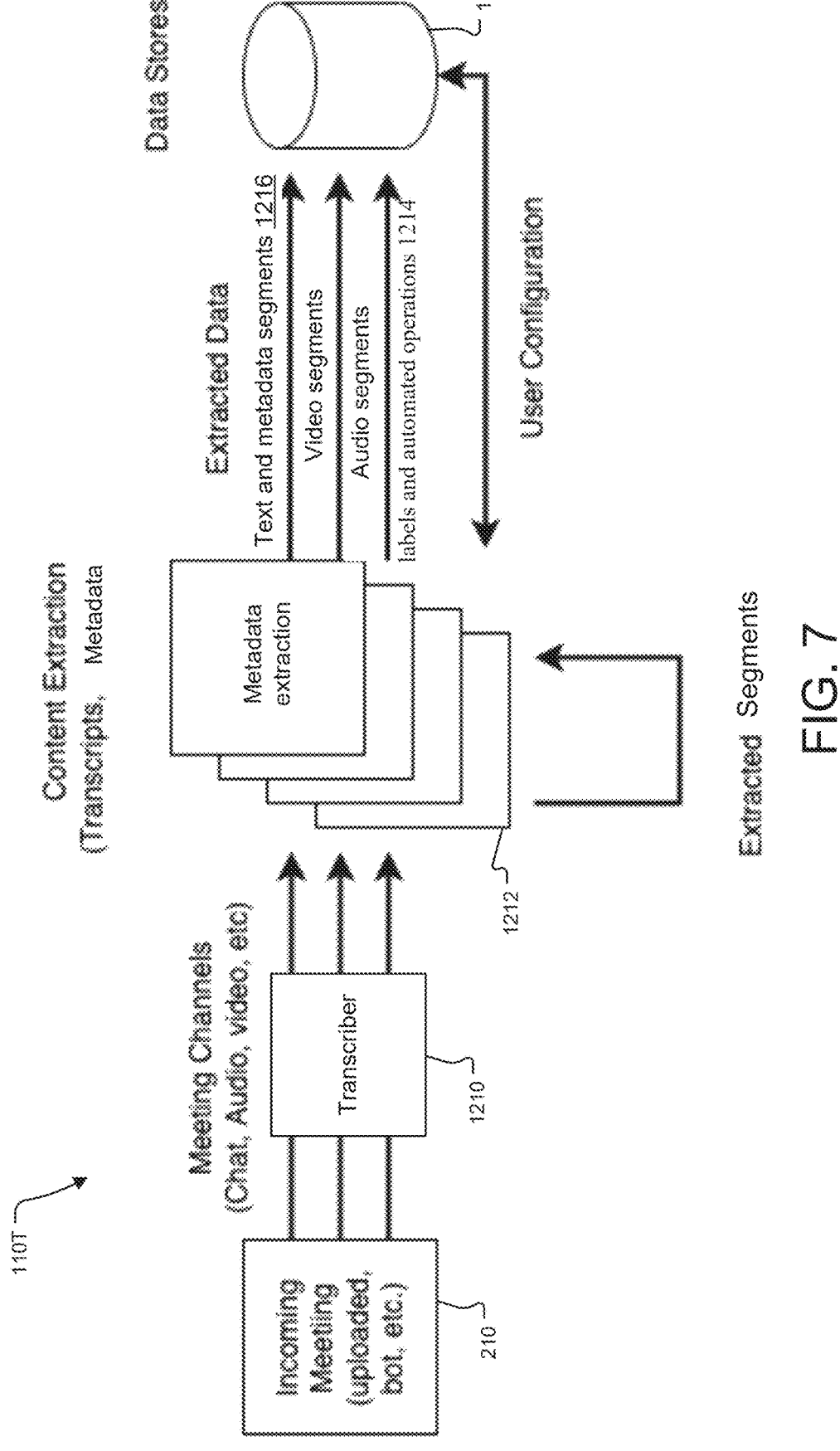
FIG. 7 is a schematic diagram showing the basic flow for generating label and automated operations and other information performed by the transcription and automation module 110T.

FIG. 7 illustrates the basic flow for generating label and automated operation and other information performed by the transcription and automation module 110T.

New meetings are ingested by uploading or ingested in realtime from streaming.

The meetings stored as recording objects 210 are broken into the different channels (audio, chat streams, video, etc.) and the data is provided to a transcriber 1210 that generates a stream of text corresponding to the recognized speech for each meeting participate. The text stream is provided to metadata extractors 1212. This can be either done as a bulk process (for uploaded files) or by streaming the data as it becomes available for ongoing meetings, etc.

The content extraction is run on the data by the metadata extractors as described in connection with step 1102 of FIG. 6. This can cover a wide range of tasks including analysis the channels for triggers giving rise to labels or automated operations. In addition, the channels are also analysis for non-verbal triggers including sentiment analysis, gesture recognition, etc. The content extraction can work on either the raw meeting channels, and the extracted transcript or the output of other extraction stages. Large language models can facilitate the extraction process.

For extraction that requires user defined values (like label and automated operations) the extraction stages fetch the user configuration from the data stores 114.

The extracted data is stored in the databases associated with the meetings in the different segments such as the video segments and the audio segments 150*n*. The extracted labels and automated operations 1214 are stored with the transcript text in the text and metadata blocks 1216 of the segments. In additional extracted automated operations that are real-time commands to the system 100 are passed on for execution such as record and pause commands.

In the current implementation of the label and automated operation feature, sets of labels and automated operations are extracted by the transcription and automation module 110T using both system and user-defined configurations which are then attached to the appropriate meeting recording segments and pages providing the text and metadata segments. This set of labels and automated operations are represented in the user interface as highlights in the text of the transcript page and points and segments on the video timeline.

Representation of Labels and Automated Operations in Live Meeting Page

It is important to teach users that they can control post-meeting business processes in real-time through their speech and actions during a meeting—generating labels and automated operations on command.

Figure 8:
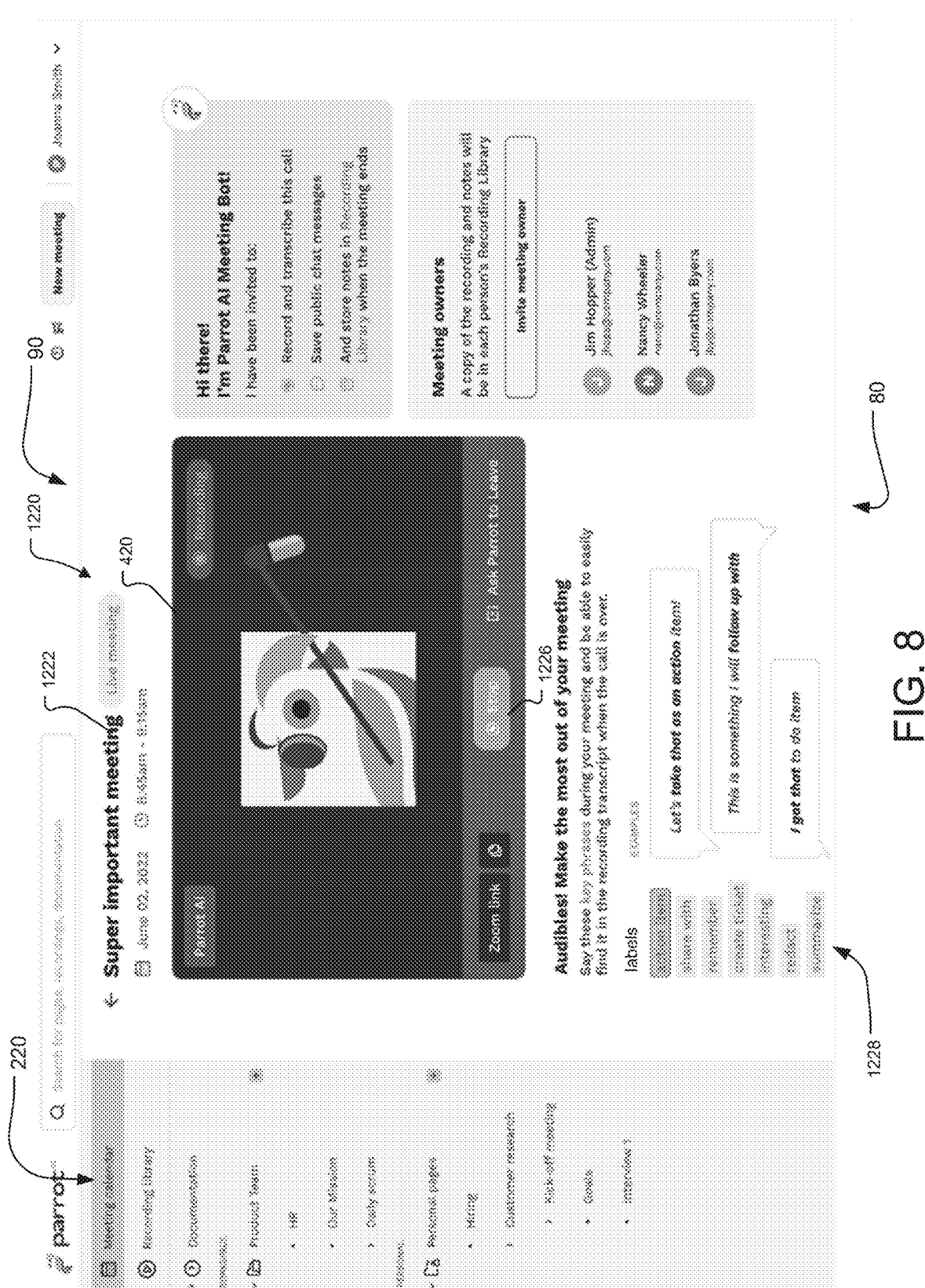
FIGS. 8-16 are screenshots of the GUI of the media presentation system showing the page editor screen and the labels and automated operations as represented in the GUI.

FIG. 8 shows the current implementation of the ongoing meeting page 1220. The page is displayed to users when the system 100 is currently recording a meeting.

The ongoing meeting page 1220 includes a title 'Super important meeting' 1222. The indicator next to the title "Live meeting" notes the meeting on ongoing. A bot status graphic 420 notes that the system 100 is currently recording the meeting. The users can stop or pause this recording using by toggling button 1226.

A label list 1228 is provided in the center-bottom text describes which labels are available to the user that will be processed by transcription and automation module 110T in the current meeting, and gives some examples of trigger phrases and commands that would trigger these labels and automated operations.

This embodiment is showing the following labels that would be automatically extracted by the from the meeting and highlighted in both the transcript and video by the transcription and automation module 110T in the corresponding recording and meeting pages:

Action item
Share with
Remember
Create ticket
Interesting
Redact
Summarize

Representation of Labels in Recording and Pages

One of the most important use cases and goals for the automatic extraction of labels and automated operations from a meeting is to make it easy to quickly find features by a meeting participant after the meeting concludes. In the page the labels and automated operations are represented two ways.

First, the center column of the page that includes the slices of real-time audio/video and their associated transcripts, comments, annotations, etc.) as well as markdown text contains highlights that match labels and automated operations.

Figure 9:
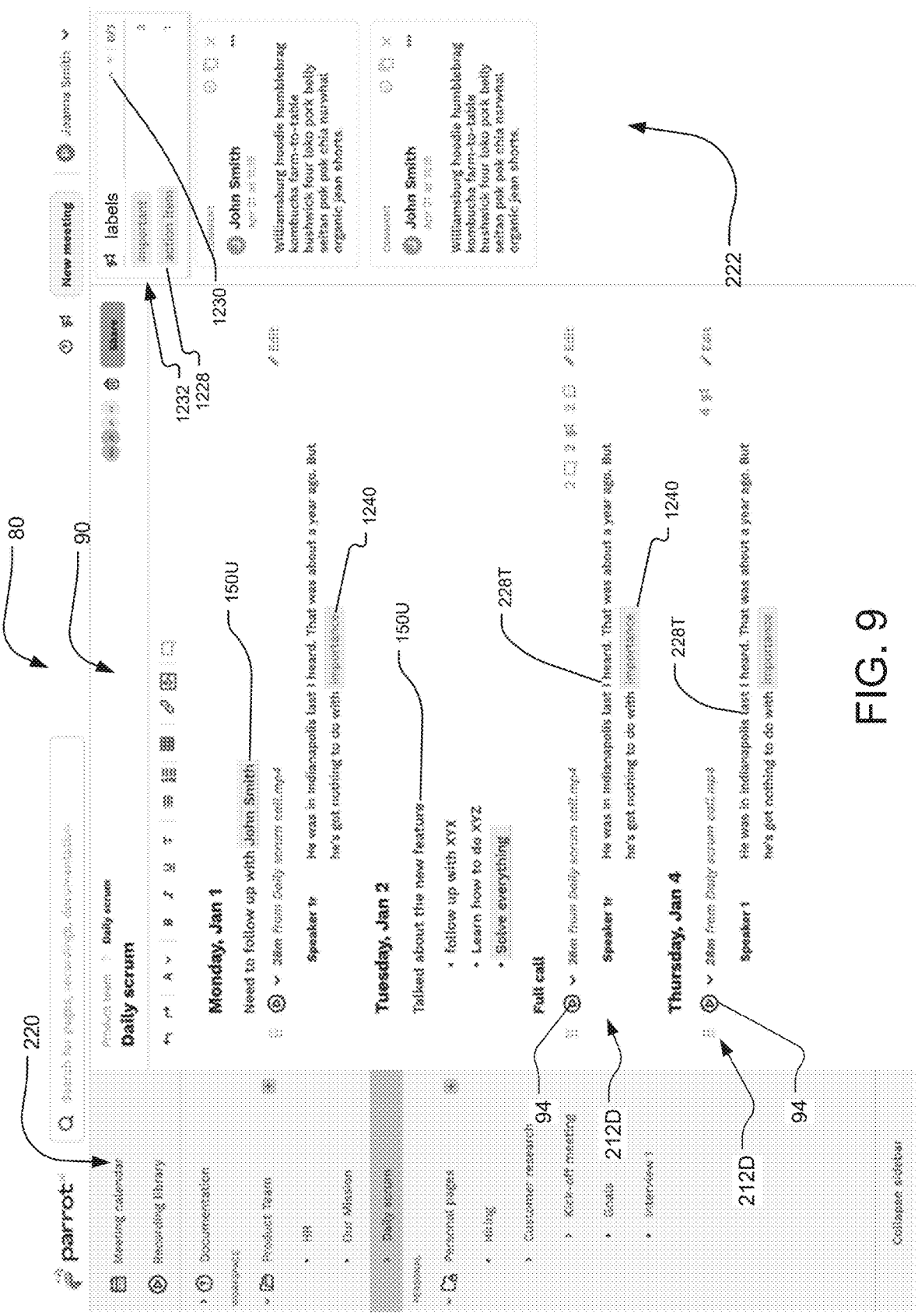
Figure 10:
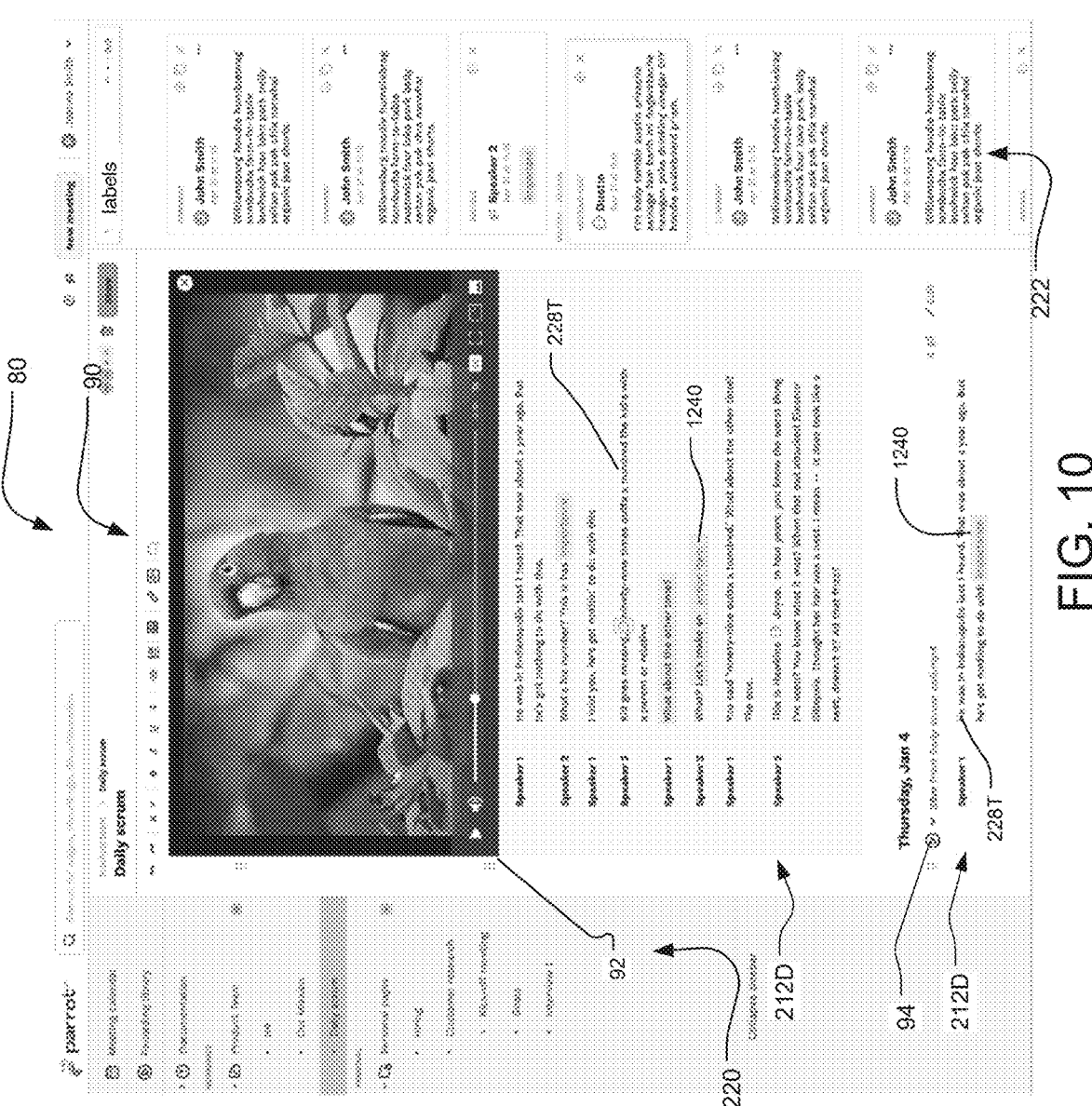
Figure 11:
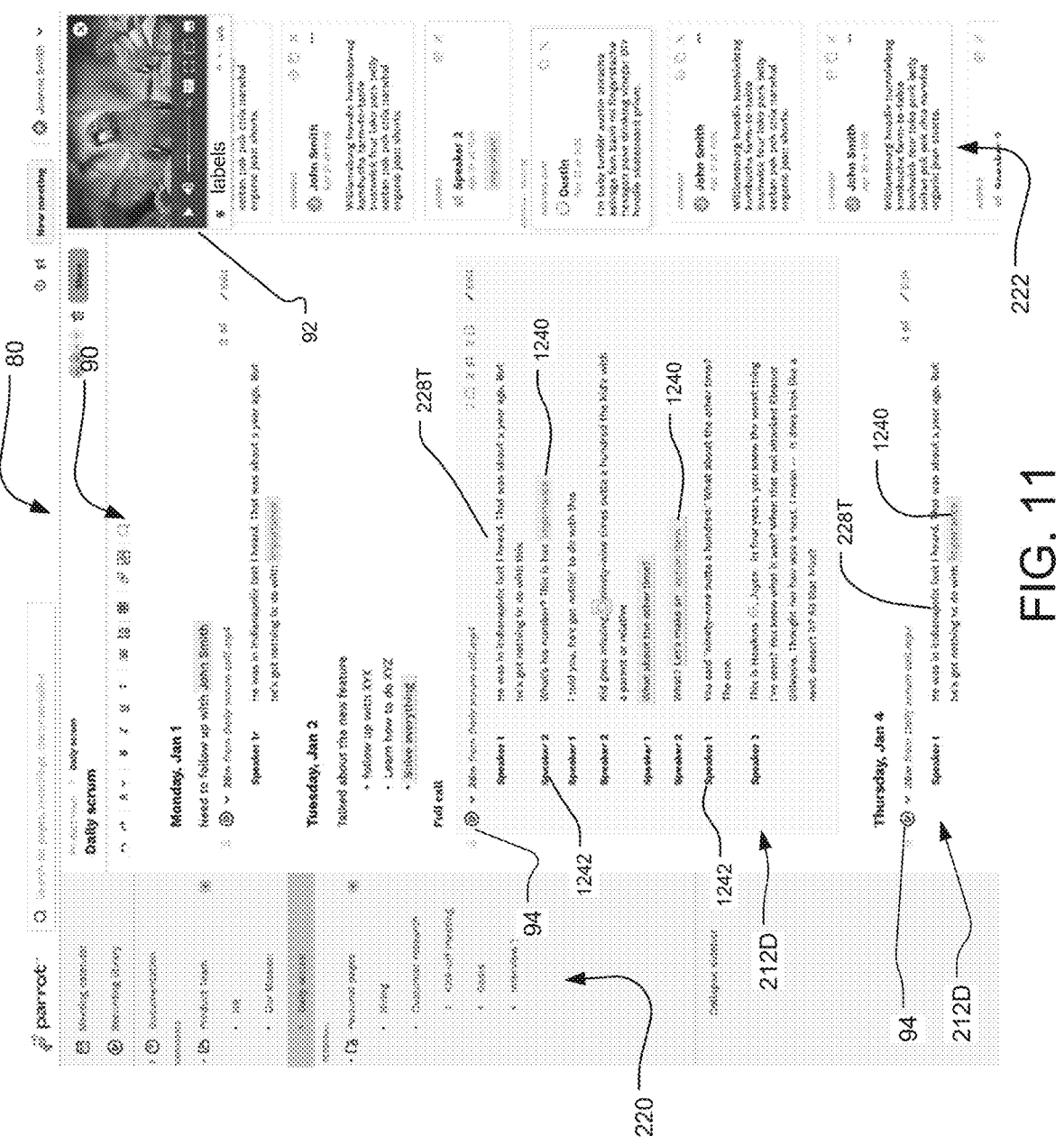

FIGS. 9, 10, and 11 show the current implementation of these features in the GUI 87 as rendered by the user app 85. The labels operation highlights are textual labels with a non-white background color such as purple, the comment highlights are non-white background color such as green.

FIG. 9 shows a document that is being authorized using the page editor 90 to document a meeting as displayed on a display of user device 80 by the user app 85. It includes user authorized content 150U along with page navigation pane 220.

Label graphics 1240 for each of the labels are displayed associated with the system-generated transcript text 228T associated with embedded clip display elements 212D.

A right column 222 includes a selector box 1232 that is used to both select which labels operations are highlighted in the center document, as well as an enumerated list 1228 of the labels and automated operations that are on the page in the page editor 90 and their count. The graphic arrow buttons 1230 in the selector box 1232 allow the user to quickly iterate through the labels and automated operations on the page, moving the focus of the editor and center page and any video playhead to the corresponding point in the audio/video/transcript provided on the page.

FIG. 10 also shows a document that is being authored using the page editor 90. It includes the embedded clip 212 with a clip player 92. The clip display element 212D includes system-generated transcript text 228T associated with the clip.

There are two types of labels in the "Daily scrum" entitled document: important, and action items. There are two important, and one action item labels and automated operations in the document.

The video playhead 92 can be hidden to maximize the screen real estate for editing the document.

The example page for the Daily scrum meeting shown in FIG. 11 is the current implementation of the system where the inline video player shows where in the moment the current playhead/editing point is. The labels again in the center column for both the important and action item labels and automated operations.

Embedding the label graphics 1240 in the system-generated transcript text 228T enables the user to quickly understand where in the meeting labels and automated operations occurred, as well as which speakers were talking when they occurred based on the speaker labels 1242 associated with the system-generated transcript text 228T.

The minimized thumbnail video player that the current implementation of the system has is shown in FIG. 11. There is a combination of labels and automated operations, comments, and zoom chat log highlights in the right hand column 222. These are represented as highlights and markers in the transcripts in the center document's moments.

Representation of Labels and Automated Operations in Search UI/UX

Finding labels and automated operations across multiple pages, recordings, and meetings is a key use case and user experience UX workflow. This workflow is typically done after some period of time has elapsed after a meeting, or by asynchronous workers collaborating in a workspace where everyone cannot be in the same synchronous meetings simultaneously—different time zones, picking up kids from school, out sick, on vacation, etc.

The current UX of this implementation is shown in FIGS. 12, 13, 14, 15 and 16.

There are results sets that are built for labels and automated operations using where, when, what to find a set of pages, moments, and comments. With the additional specification of label and automated operation types, the result set is further scoped to represent sets of pages, recordings, and moments that also contain the labels and automated operations.

Figure 12:
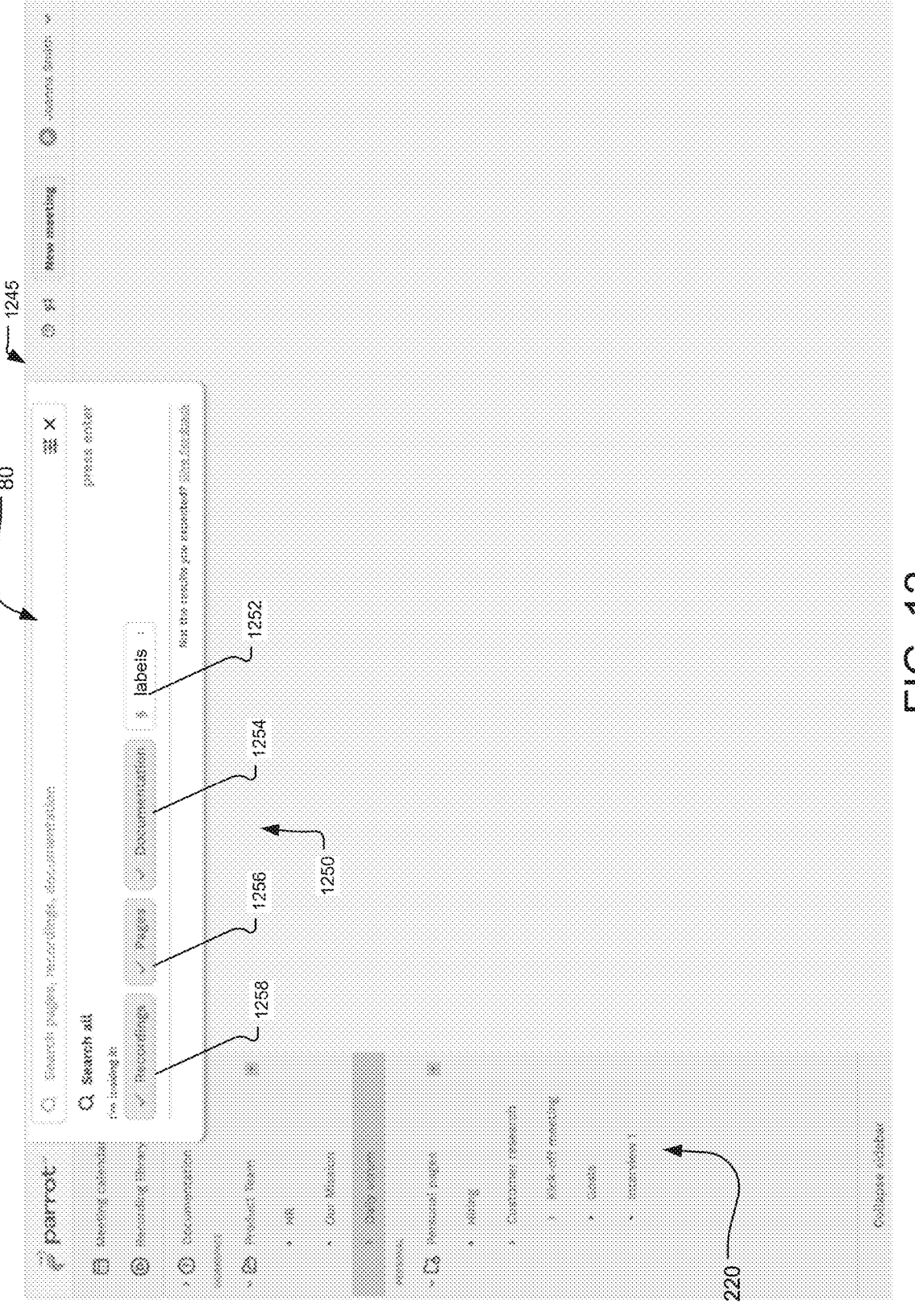

The initial search panel 1250 is shown in the search page 1245 shown in FIG. 12, where a simple search for keywords will return a set of recordings, pages, and documentation when the respective recordings operations button 1258, pages operations button 1256, and documentation operations button 1254 are selected. If the user clicks on the labels automated operations button 1250, the workflow pane is displayed as shown in FIG. 13.

Figure 13:
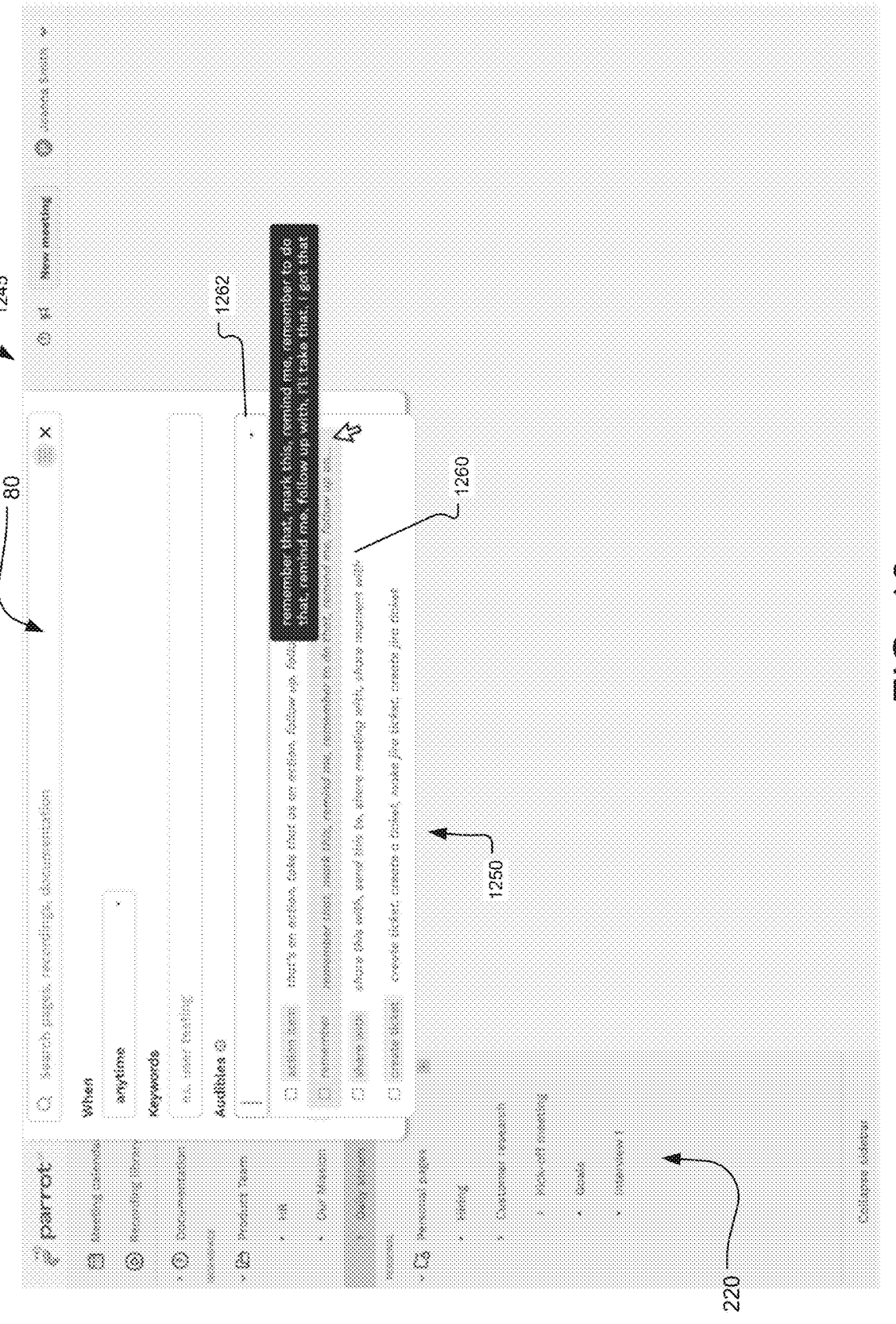

The advanced search panel—where label and automated operations search is specified—is shown in the search page 1245 shown in FIG. 13. A list 1260 of both system and user-defined labels and automated operations are enumerated and selected here by user operation with the user interface. A user can also type into the labels and automated operations input box 1262 (which then matches appropriate label and automated operation feature types) to find the label and automated operation quicker.

Figure 14:
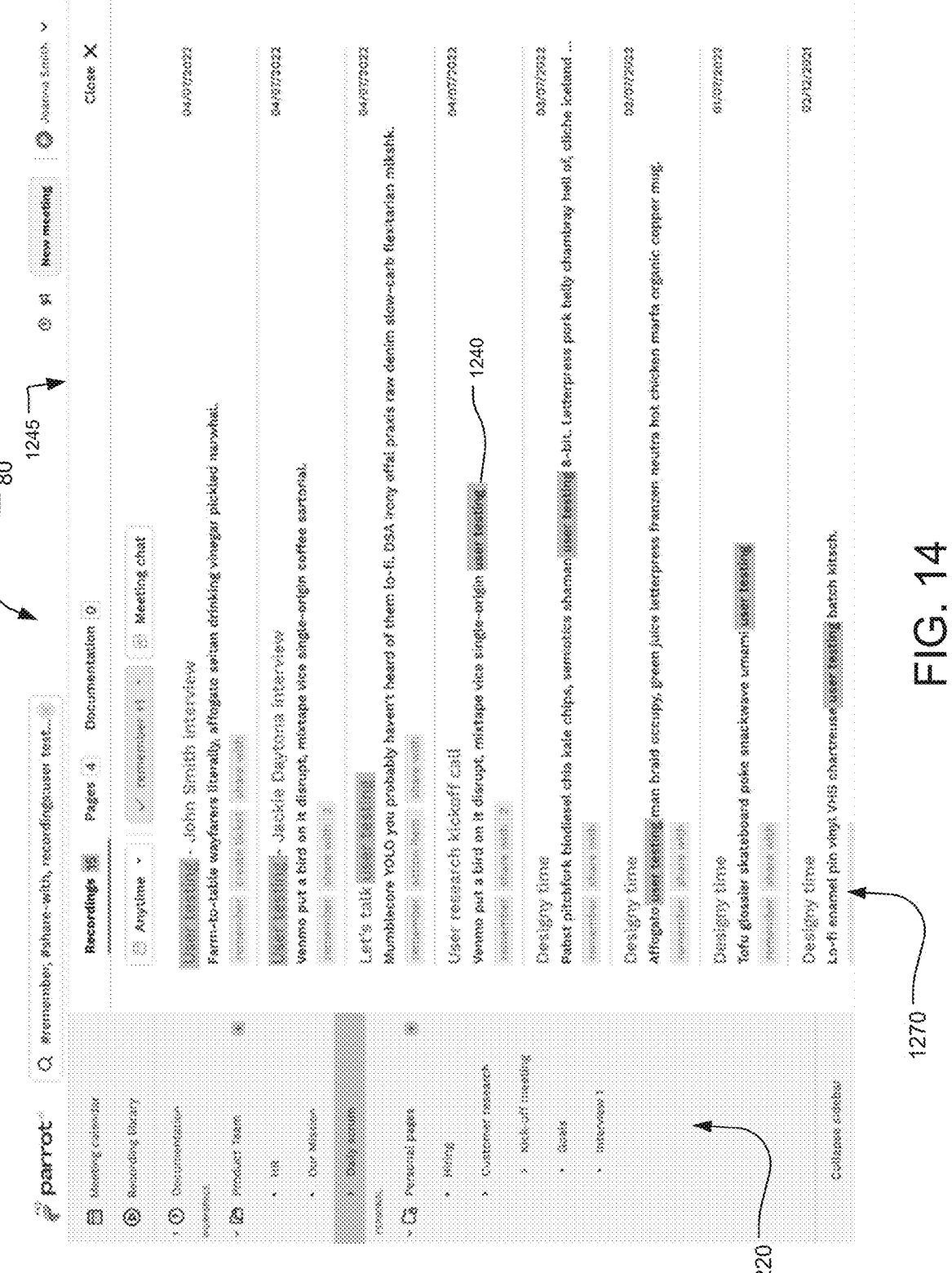

The results search page 1245 from an example of the label and automated operation advanced search is shown in FIG. 14. The results are presented in a list 1270. In the example, the user has searched in Recordings for the keywords 'user testing' and the labels "remember" and "share with". The results show each of the 15 recordings that match the criteria with highlighted keywords and label graphics 1240.

Figure 15:
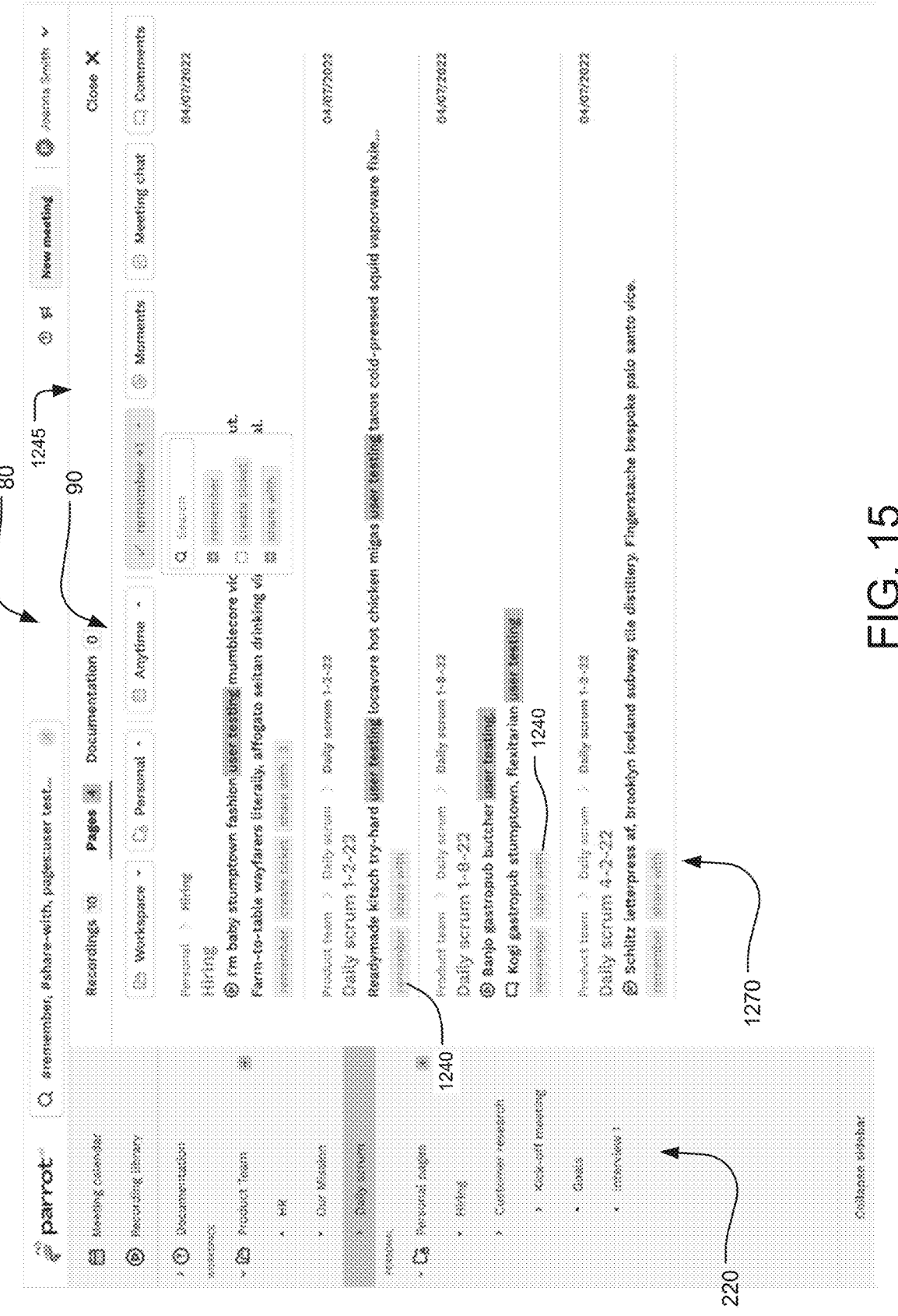

A second example is shown in the search page 1245 of FIG. 15, where the user has search for pages in their selected workspace that match the keywords 'user testing' and the two labels: remember and share with. There are four pages in the workspace that have matches for this search and presented in list 1270. The label selection drop down shows there is a third label and automated operation present on those results page—"create ticket"—that could be selected as well.

App Wrapping

There are several embodiments of the application's user interface. One is as a separate web-app from the video conferencing application. In this embodiment, the bot interacts with the video conferencing platform as any other participant—sends video, audio, chat as a participant. The labeling and the meeting automations and their feedback happen in the web-app, and are represented in the video conferencing platform using audio, video, and chat feedback as a participant (e.g. participant video displays status and results from labeling and the meeting automations, chat contains links to real-time labeling and the meeting automations results).

In another example, the system has a tighter integration with the video conferencing platform. There are dedicated parts of the video conferencing UI that enable control and interaction with the system to control and interact with real-time labeling and the meeting automations. For example, the real-time video, screenshare, chat, and labeling and the meeting automations control, status and results all within an integrated display and UI.

Automatic Table of Contents Generation for Labeling and the Meeting Automations Sets The system implements several approaches for finding and indexing post-processed labeling and the meeting automations results in a document. The first is described in connection with FIGS. 9 and 10, showing how labeling and the meeting automations (termed audibles) in the page are represented by the "Label" button at the top in the right hand column. This quickly allows the user to search for any labeling and the meeting automations and to quickly jump and iterate through the labeling and the meeting automations on a page from a single position in the UI. A second method is by creating automated tables of content-style labeling and the meeting automations lists that are inserted into the page. These can be positioned directly by the user, or automatically prepended or appended to the page at creation time.

In practice, this results in the page with a section titled Audibles, with subsections for each labeling and the meeting automations type the user configures, and links with context to each labeling and the meeting automations in the page. This allows for users to quickly see how many of a certain type of labeling and the meeting automations were found in the page, which recordings, and moments they came from, and the context and content of the labeling and the meeting automations as well. This visual enumeration of the key parts of a meeting is quickly absorbed by the user. For example, it would list all of a meeting's action items and summary at the top of the page for quick reference and document navigation.

Figure 16:
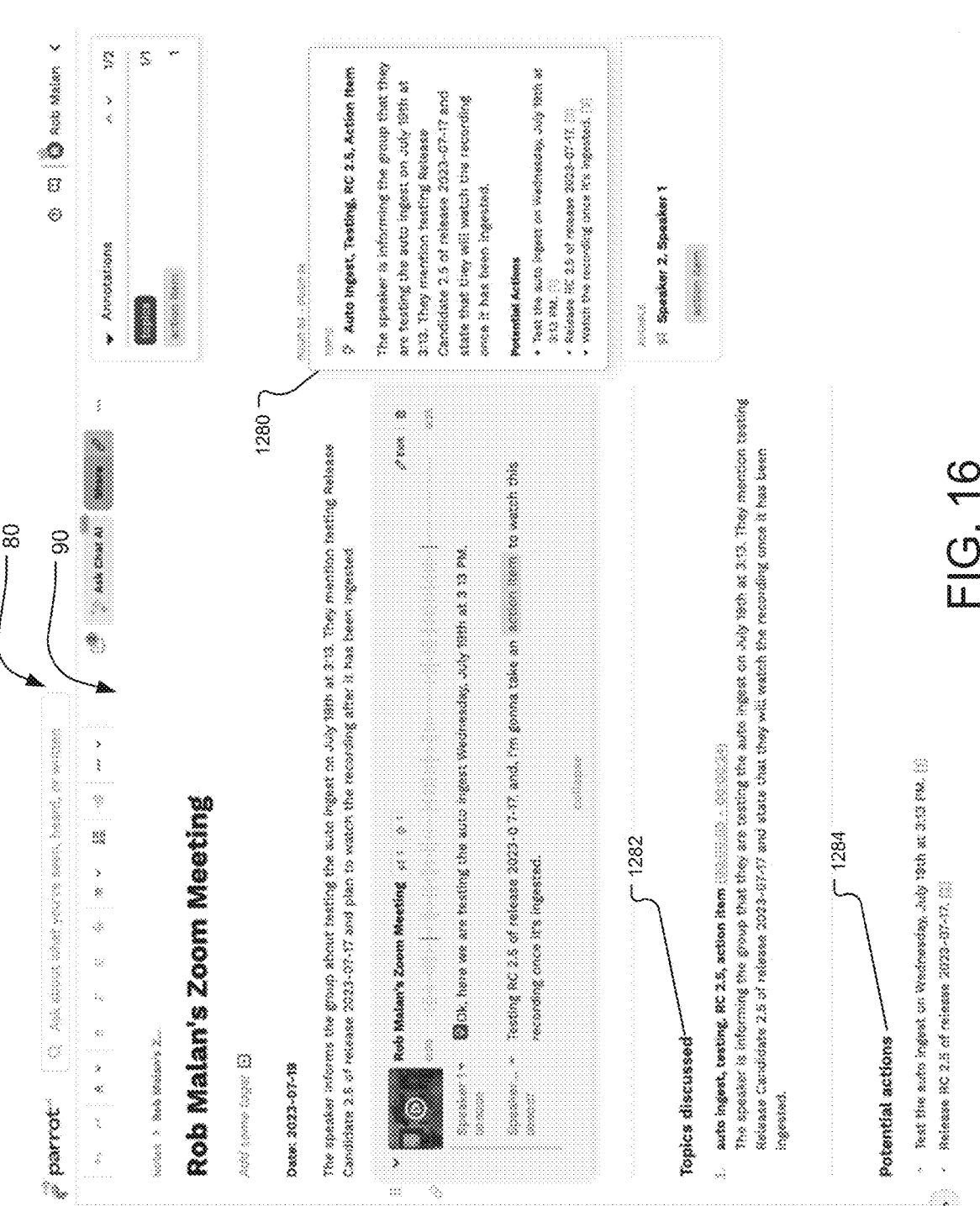

FIG. 16 illustrates how embeddings are used as a way to index and automatically segment meetings into topics.

Here, a LLM automatic topic and recording segmentation implementation is shown. It automatically generates topics and tags from a recording. The topics are shown as a commentary in a bubble 1280 to the right of the text. It uses per sentence LLM embeddings to group segments of the recording by topic. It generates a set of topics discussed and potential action items as part of the current embodiment. This is an example of how the labelling feature is extended using LLM technologies in the current implementation.

A list of topics 1282 are generated and presented near the bottom of the page.

In addition, a list of potential actions 1284 is also generated and presented near the bottom of the page.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for controlling a meeting, the method comprising:
   ingesting a recording of a meeting;
   storing in a data store time-indexed media data of the recording of the meeting,
      wherein the time-indexed media data comprises multiple data layers each with differing temporal elements;
   analyzing the time-indexed media data for commands; and controlling recording including starting and pausing the recording based on detected commands.

2. The method of claim 1, wherein the commands include ending recording of the meeting.

3. The method of claim 1, wherein the commands include redacting portions of the recording of the meeting.

4. The method of claim 1, wherein the commands include controlling a display of the meeting.

5. The method of claim 1, wherein the commands are indicated by a trigger word.

6. A system for meeting recording and documentation, the system comprising:

a server system including a data store for ingesting time-indexed media data of a meeting and storing the time-indexed media data of the meeting, wherein the time-indexed media data comprises multiple data layers each with differing temporal elements;

a transcription and automation module for analyzing the time-indexed media data for commands; and the server system controlling recording including starting and pausing the recording based on detected commands.

7. A method for documenting meetings, the method comprising:

generating a graphical user interface that enables users to author documents and to embed reference data defining referenced portions of time-indexed content from the meetings in the documents wherein the time-indexed content comprises multiple data layers each with differing temporal elements;

displaying transcript text corresponding to the referenced portions; and analyzing the time-indexed content and adding labels to the documents based on the analysis.

8. The method of claim 7, wherein the labels are displayed in association with the transcript text.

9. The method of claim 7, wherein the labels indicate action items.

10. The method of claim 7, wherein the labels indicate areas of importance.

11. The method of claim 7, further comprising enabling search function of the time-indexed content based on the labels.

12. The method of claim 11, wherein the search function provides a list of suggested labels to search.

13. The method of claim 7, further comprising displaying available labels during the meeting.

14. The method of claim 7, further comprising employing labels and/or other embedded information to extract user intent via a large language model (LLM).

15. The method of claim 14, wherein the embedded information is used to segment the transcript text.

16. A system for documenting meetings, the system comprising:

a server system including a data store for ingesting time-indexed media data of a meeting and storing the time-indexed media data of the meeting, wherein the time-indexed media data comprises multiple data layers each with differing temporal elements; and a transcription and automation module for analyzing the time-indexed media data for commands and analyzing the time-indexed media data and adding labels to transcribed documents of the time-indexed media data based on the analysis.

* * * * *